United States Patent
Chalvet et al.

(10) Patent No.: US 12,173,745 B2
(45) Date of Patent: Dec. 24, 2024

(54) ADJUSTING ELEMENT, FIRST COMPONENT WITH ADJUSTING ELEMENT, CONNECTION STRUCTURE COMPRISING THE FIRST COMPONENT, MANUFACTURING METHOD OF THE ADJUSTING ELEMENT AND CONNECTION METHOD

(71) Applicants: BÖLLHOFF VERBINDUNGSTECHNIK GmbH, Bielefeld (DE); Bollhoff Otalu S.A., La Ravoire (FR)

(72) Inventors: Franck Chalvet, Saint-Baldoph (FR); Wolfgang Hesse, Rietberg (DE)

(73) Assignees: Böllhoff Verbindungstechnik GmbH, Bielefeld (DE); Bollhoff Otalu S.A., La Ravoire (FR)

( * ) Notice: Subject to any disclaimer, the term of this patent is extended or adjusted under 35 U.S.C. 154(b) by 0 days.

(21) Appl. No.: 18/563,945

(22) PCT Filed: Apr. 14, 2022

(86) PCT No.: PCT/EP2022/060083
§ 371 (c)(1),
(2) Date: Nov. 24, 2023

(87) PCT Pub. No.: WO2022/248121
PCT Pub. Date: Dec. 1, 2022

(65) Prior Publication Data
US 2024/0240659 A1    Jul. 18, 2024

(30) Foreign Application Priority Data
May 27, 2021 (EP) .................... 21305697

(51) Int. Cl.
*F16B 5/02* (2006.01)
*F16B 37/06* (2006.01)

(52) U.S. Cl.
CPC ............ *F16B 5/0233* (2013.01); *F16B 5/025* (2013.01); *F16B 5/02* (2013.01); *F16B 37/067* (2013.01)

(58) Field of Classification Search
CPC .......... F16B 5/02; F16B 5/0233; F16B 5/025; F16B 21/18; F16B 23/00; F16B 37/00;
(Continued)

(56) References Cited

U.S. PATENT DOCUMENTS

D30,898 S * 5/1899 Paine .............................. D8/397
633,212 A * 9/1899 Paine ..................... F16B 37/00
411/937.1
(Continued)

FOREIGN PATENT DOCUMENTS

CN         101135331 A     3/2008
CN         102654154 A     9/2012
(Continued)

OTHER PUBLICATIONS

CN Office Action for CN Application No. 202280037112.7 dated Mar. 14, 2024 (16 pages).
(Continued)

*Primary Examiner* — Roberta S Delisle
(74) *Attorney, Agent, or Firm* — Reising Ethington P.C.

(57) ABSTRACT

An adjusting element formed in one piece and made of metal for compensating a tolerance in the distance between a first and a second component is described. The adjusting element comprises: a hollow-cylindrical body having a radially outwardly extending flange adjacent to a first axial end and an outer thread of a first thread direction at a radial outer side, a drive feature so that the adjusting element is rotatable by
(Continued)

Figure 1:
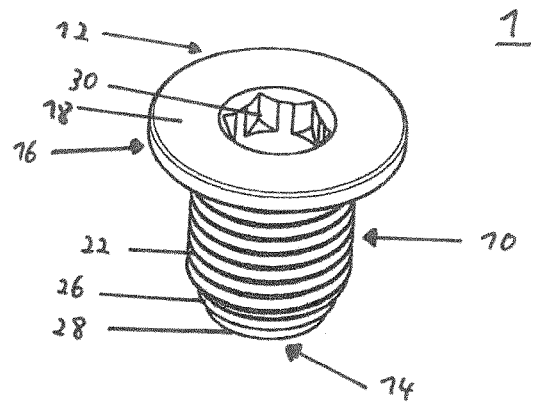

a tool, a receiving portion at the radial inner side of the hollow-cylindrical body, in which a dragging element is to be received, wherein the receiving portion comprises at least one radially inwardly extending protrusion, in particular a plurality of radially inwardly extending protrusions, at a radial inner side of the hollow-cylindrical body adapted to a form-fit connection with the dragging element and at least one shoulder extending circumferentially at the radial inner side and providing an axial limitation.

14 Claims, 23 Drawing Sheets

(58) Field of Classification Search
CPC ........ F16B 37/06; F16B 37/067; F16B 39/10; F16B 39/24; F16B 43/00
USPC .......... 411/383, 427, 432, 517, 546
See application file for complete search history.

(56) References Cited

U.S. PATENT DOCUMENTS

| | | | |
|---|---|---|---|
| 3,752,515 A * | 8/1973 | Oaks | F16B 21/183 |
| | | | 299/109 |
| 6,789,993 B2 * | 9/2004 | Ozawa | F16B 5/0233 |
| | | | 411/432 |
| 7,226,263 B2 | 6/2007 | Schwarzbich | |
| 7,591,403 B2 | 9/2009 | Binder et al. | |
| 7,891,927 B2 | 2/2011 | Burger et al. | |
| 8,066,465 B2 | 11/2011 | Figge et al. | |
| 8,202,033 B2 * | 6/2012 | Choi | B62D 27/065 |
| | | | 411/546 |
| 8,827,585 B2 | 9/2014 | Figge et al. | |
| 8,864,432 B2 | 10/2014 | Figge et al. | |
| 9,771,962 B2 | 9/2017 | Metten et al. | |
| 9,829,020 B2 | 11/2017 | Ortega Dona | |
| 10,145,399 B2 | 12/2018 | Haselberger et al. | |
| 10,544,816 B2 | 1/2020 | Busquets | |
| 11,168,722 B2 * | 11/2021 | Erpenbeck | F16B 41/002 |
| 11,506,233 B2 * | 11/2022 | Spickenheier | F16B 5/025 |
| 11,512,732 B2 | 11/2022 | Figge | |
| 11,754,103 B2 | 9/2023 | Figge et al. | |
| 11,933,348 B2 | 3/2024 | Jodeleit | |
| 2005/0047893 A1 | 3/2005 | Schwarzbich | |
| 2007/0009341 A1 * | 1/2007 | Nagayama | B21K 1/56 |
| | | | 411/176 |
| 2009/0080998 A1 * | 3/2009 | Nagayama | F16B 39/284 |
| | | | 411/432 |
| 2022/0049733 A1 * | 2/2022 | Spickenheier | F16B 5/025 |

FOREIGN PATENT DOCUMENTS

| | | |
|---|---|---|
| CN | 104271964 A | 1/2015 |
| CN | 108361265 A | 8/2018 |
| CN | 208702877 U | 4/2019 |
| CN | 109899347 A | 6/2019 |
| CN | 112343910 A | 2/2021 |
| DE | 10034968 A1 | 1/2002 |
| DE | 10131340 A1 | 1/2002 |
| DE | 10300991 A1 | 7/2004 |
| DE | 102013216716 A1 | 2/2015 |
| DE | 102017100442 A1 | 7/2018 |
| DE | 102018201496 A1 | 8/2019 |
| EP | 1510701 A1 | 3/2005 |
| EP | 1533185 A1 | 5/2005 |
| EP | 2951447 A1 | 12/2015 |
| EP | 3114359 A1 | 1/2017 |
| EP | 3237763 A1 | 11/2017 |
| WO | WO2007008372 A1 | 1/2007 |
| WO | WO2010022841 A1 | 3/2010 |
| WO | WO2014120707 A1 | 8/2014 |
| WO | WO2015131218 A1 | 9/2015 |
| WO | WO2016105751 A1 | 6/2016 |
| WO | WO2018060055 A1 | 4/2018 |
| WO | WO2020014422 A1 | 1/2020 |

OTHER PUBLICATIONS

EP Extended Search Report for EP Application No. 21305697.1 dated Oct. 26, 2021, (11 pages).
EP Office Action for EP Application No. 21305697.1 dated Jul. 4, 2022, (6 pages).
Written Opinion & International Search Report for PCT/EP2022/060083 dated Jul. 6, 2022, (20 pages).
EP Grant Intention EP Application No. 21305697.1 dated Jan. 27, 2023, (8 pages).

* cited by examiner

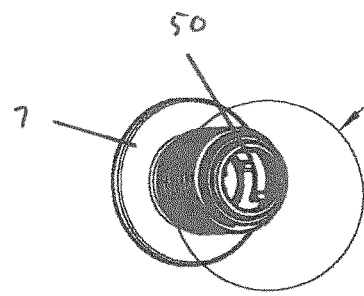
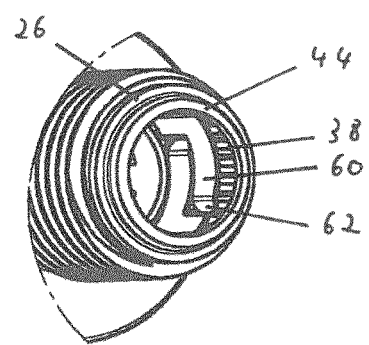
Fig. 16a     Fig. 16b
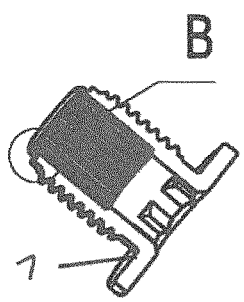
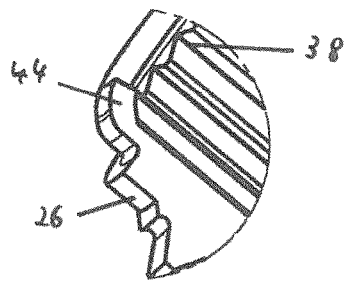
Fig. 17a     Fig. 17b
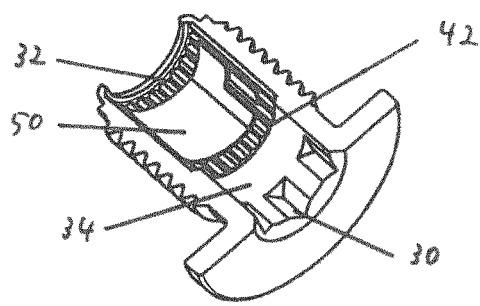
Fig. 18

ADJUSTING ELEMENT, FIRST COMPONENT WITH ADJUSTING ELEMENT, CONNECTION STRUCTURE COMPRISING THE FIRST COMPONENT, MANUFACTURING METHOD OF THE ADJUSTING ELEMENT AND CONNECTION METHOD

1. TECHNICAL FIELD

The present disclosure is related to an adjusting element for compensating a tolerance in the distance between a first and a second component, a first component comprising an adjusting element, a connection structure comprising two components and using the adjusting element, a manufacturing method for an adjusting element as well as a connection method for connecting two components at each other.

2. BACKGROUND

In the prior art, tolerance compensation arrangements for compensating a distance between a first and a second component to be fixed at each other are known in a wide variety. Such tolerance compensation arrangements consist of an adjusting element made of plastic and having an outer thread of a first thread direction and a dragging element arranged in a through bore of the adjusting element. The adjusting element is screwed into a base element, for example a blind rivet nut, having an inner thread matching the outer thread of the adjusting element as well as a fastening thread of a second thread direction opposite to the first thread direction.

In use, the blind rivet nut as base element having the adjusting element arranged therein is fastened in an opening of the first component. Thereafter, a second component having a second opening is arranged in a distance to and in alignment with the first component. A fastening screw is inserted through the second opening of the second component and comes into engagement with the dragging element arranged in the adjusting element. By rotating the screw, the adjusting element is screwed out of the base element and into abutment with the second component. A further rotating of the screw causes that the screw comes into engagement with the fastening thread of the base element. After the screw has been tightened, the process is complete.

An exemplary device for joining parts using a blind rivet nut and compensating a tolerance in the distance between the first and the second component is described in EP 1 510 701 A1. The device for connecting components comprises the blind rivet nut, which is fastened in the first component with the aid of a setting tool having a threaded bolt. Further, the device comprises a spacer which is in threaded engagement with the blind rivet nut and which is screwed out of the blind rivet nut and comes into abutment on the other component by a movement of the spacer. A connecting screw can be screwed into the blind rivet nut and a torque-transmitting intermediate member is arranged in a receptacle of the spacer which transmits a torque to the spacer when the connecting screw is screwed in. To anchor the blind rivet nut in the first component, the threaded bolt can be inserted into the intermediate member and the spacer and then screwed into the blind rivet nut without the spacer being rotated in its unscrewing direction.

A further device for compensating tolerances between two components to be connected is described in DE 10 2018 201 496 A1. This device comprises a hollow cylindrical base element, a hollow cylindrical compensating element which is in thread engagement with the base element and which can be moved from a starting position to a compensating position by rotating relative to the base element, a threaded element for a screw connection with a screw element extending through an inner cavity of the base element and an inner cavity of the compensating element and a dragging element arranged in the inner cavity of the compensating element. The dragging element is injection molded onto a lateral surface of the inner cavity of the compensating element in an injection molding process. Further, the dragging element is in frictional engagement with the screw element passed through the cavities such that a torque exerted by the screw element is transferable to the compensating element.

DE 103 00 991 A1 describes a compensating screw connection for connecting two components that are spaced apart from one another with a tolerance. The connection comprises a base element that can be fastened to the first component, having an opening for inserting a connecting screw, and a compensating element, which is assigned to the base element via helically rising incline support surfaces and counter-incline support surfaces in such a way that, starting from a basic position in which the compensating screw connection has its shortest length, it is rotationally driven by means of the connecting screw into a spaced position, but at most up to a stop on the base element. It is essential that the incline support surfaces and counter-incline support surfaces are formed by an internal and external thread and the stop is formed by an end radial projection of a thread rib and associated stop step of a thread groove.

A compensating nut is described in WO 2020/014422 A1. The compensating nut comprises an exterior sleeve provided with an interior thread and an interior sleeve provided with an exterior thread. The interior and exterior sleeves are coupled together by means of their threads in order to move the interior and exterior sleeves relative to one another. Further, the compensating nut comprises a washer and a centering body is placed on said interior sleeve.

EP 3 237 763 A1 describes a further compensating nut formed by the assembly of a nut and a bolt. The compensating nut is used to attach an application to a surface or panel while maintaining a variable distance between said surface and the supporting element or chassis in which the nut is attached. The compensating nut prevents that this distance collapses when said application attachment bolt is tightened and includes a slightly flexible plastic annular body, such as an overmolded sleeve of vulcanized plastic, held tightly in the cylindrical axial internal hollow of said bolt.

Another compensation nut of the type used to perform fixing together of two parts which may be joined together at a slightly variable distance while maintaining said distance separating them is described in EP 2 951 447 A1. The nut is formed by a combination of a top part, one or more intermediate nuts and a base clip or nut, which are provided with threads which allow mutual mating thereof and mutual retraction or extension thereof by means of a single screwing operation, said threads each being provided with stops which limit relative displacement thereof.

EP 3 114 359 A1 describes a device for a spaced apart connection of a structural element, which may be made from a fiber-reinforced plastic composite material, with a holding element by means of a connection screw, with a distance compensation element comprising a longitudinal bore for the passage of the connection screw, and with an entraining element arranged in the longitudinal bore. The entraining element can be connected to the connection screw by means of a friction fit so that the distance compensation element can be transferred into an abutment position bridging the distance between the structural element and the holding element by screwing in of the connection screw. The distance compensation element is connected to an insertion part via a screw connection. The insertion part comprises a fastening section that can be arranged within the structural element for bonding with the structural element.

A further device for fastening a first component in a spaced-apart position to a second component is described in DE 101 31 340 A1. The device comprises a fastening piece which can be fastened to the second component, a connecting screw and a spacer assigned to the fastening piece and moving from a remote position to the first component into a contact position thereto when screwing in the connecting screw. A stop element assigned to the spacer and protruding radially outwardly is provided for stopping the displacement of the spacer on a third component that determines the distance.

DE 100 34 968 A1 is related to a clip that can be slipped onto the edge of a component and has a screw-in sleeve that can be brought into alignment with an opening of the component close to the edge and a fastening leg connected to the screw-in sleeve by means of a web overlapping an edge of the component through which a screw engages which is to be screwed into the screw-in sleeve through the opening of the component. To facilitate the assembly, the fastening leg forms a tension element exerting a force on the screw against the screwing-in direction, which is in frictional engagement with the screw and moves away from the component when the screw is screwed in as a result of the rotary drive.

A device for compensating tolerances between two components to be connected, with a base element which defines an axial direction, a compensation element which is movable relative to the base element to compensate for tolerances between the components to be connected, and a securing means for securing the compensating element against movement relative to the base element is described in DE 10 2013 216 716 A1. The securing means can be released independently of a movement of the compensating element relative to the base element.

DE 10 2017 100 442 A1 describes a cage nut for fastening a first component to a second component with a cage and a nut positively mounted in the cage. The cage nut has a fastening part arranged on the cage in order to arrange the cage nut on the first component. A nut thread of the nut is accessible on both sides through cage recesses in the cage. The cage nut has a compensating element and a driving sleeve, the compensating element having a screw thread adapted to the nut thread and a longitudinal bore from a first compensating element end to a second compensating element end. The driver sleeve is arranged in a force-locking manner in the longitudinal bore. The compensating element is screwed into the nut in a starting position so that the compensating element is unscrewed from the nut up to a component stop of the second component in a stop direction when a fastening screw passing through the driver sleeve is screwed into a component thread of the second component in the stop direction.

A spring element for a device for compensating for tolerances between a first and a second component is described in WO 2018/060055 A1. The spring element has at least one spring arm which has two opposite end regions along its longitudinal direction. At least one of the end regions has a greater distance from a longitudinal central axis of the spring element than an intermediate section of the spring arm between the end regions. Further, at least one of the end regions forms a corner which protrudes radially outwards.

Finally, a tolerance compensation element is described in EP 1 533 185 A1. The device is used for bridging a gap between a carrier part and a roof body and intended for fastening a roof rack, roof rail, roof strip or the like on a vehicle roof. The device comprises a support part and a counter-support part, the support part and the counter-support part being held together by a screw connection and being displaceable relative to one another to allow the adjustment of the bridging length. The support part and/or counter-support part being provided with an internally disposed adjustment tool-gripping seat intended for the manipulation and/or adjustment of the bridging length.

Most of the above-described arrangements consist of multiple separate parts, i.e., the base element, the adjusting element, and the dragging element. Only the base element and the fastening screw are made of metal whereas the adjusting element is made of plastic. In some approaches, no separate dragging element is required as the dragging function is provided directly by the adjusting element. However, such solutions are cost intensive.

Furthermore, the adjusting element with integrated dragging function must be handled carefully during transport as the geometry of the dragging section is fragile and unprotected. Further, a relatively large installation space is required compared to other solutions. Finally, a limitation in the choice of the materials for the dragging section exists as this section is usually injection molded into the adjusting element.

In addition, most of the above arrangements comprise a dragging element made of plastic, which is disadvantageous. For instance, dragging elements of plastic have a relatively low dragging force and the maximum contact pressure is reached very fast. In such a case, the tips of the thread of the fastening screw make a groove in the dragging element. The resulting negative effect can be compensated by increasing the contact surface. This, in turn, leads to the fact that again more installation space is required for the dragging element, like it is the case for adjusting elements with integrated dragging function.

Further, and with respect to dragging elements made of plastic, such elements are vulnerable to the influence of the surrounding, like temperature and humidity. This may lead to a failure of the dragging element. The same applies with respect to adjusting elements made of plastic.

A dragging element made of metal requires, on the other hand, usually a separate element for fixing the dragging element in the adjusting element. Thus, the manufacturing process is complex.

It is therefore the object of at least some implementations of the present disclosure to provide, in view of the prior art, an improved adjusting element and a respective manufacturing method which realizes a compact construction, i.e. requires less installation space, ensures high holding forces and is cost-efficient at the same time.

3. SUMMARY

The above object is solved by an adjusting element, a first component comprising the adjusting element, a connection structure comprising the first component, a manufacturing method for an adjusting element and a connection method for connecting two components at each other. Further embodiments and developments of the present disclosure result from the following description, the drawings as well as the appending claims.

The adjusting element is formed in one piece, made of metal and it is used for compensating a tolerance in the distance between a first and a second component. The adjusting element comprises: a hollow-cylindrical body having a radially outwardly extending flange adjacent to a first axial end and an outer thread of a first thread direction at a radial outer side, a drive feature so that the adjusting element is rotatable by a tool, a receiving portion at the radial inner side of the hollow-cylindrical body, in which a dragging element is to be received, wherein the receiving portion comprises at least one radially inwardly extending protrusion, which may be a plurality of radially inwardly extending protrusions, at a radial inner side of the hollow-cylindrical body adapted to a form-fit connection with the dragging element and at least one shoulder extending circumferentially at the radial inner side and having or providing an axial limitation.

The adjusting element has the known features of a hollow-cylindrical body having a radially outwardly extending flange adjacent to a first axial end and an outer thread of a first thread direction at a radial outer side. In use, the flange is arranged near the first component in a starting position, which may be with a lower side thereof, i.e. with the side of the flange facing in the direction of a second axial end of the hollow-cylindrical body. In a final state or position, the upper side of the flange, i.e. the side opposite to the lower side, abuts at the second component for maintaining the distance between the first and the second component.

The outer thread may be arranged at or adjacent to the second axial end of the hollow-cylindrical body. Further, a threadless portion may be present between the lower side of the flange, i.e. the side of the flange facing the second axial end, and the outer thread. The advantage of this threadless portion or groove is that a complete screwing in of the adjusting element into a first inner thread is possible. Due to this, the adjusting element can be locked in the first inner thread, which provides a transport security. When proceeding in this way, the adjusting element must be unlocked, i.e. screwed out of the first inner thread so that a small gap exists between the lower side of the flange and the first component, before it can be used for compensating a tolerance in the distance to a second component. Furthermore, a threadless portion may be present at the second axial end before the outer thread begins. This threadless portion has the function of a pilot portion for facilitating a screwing in.

The drive feature may be used for screwing the adjusting element into a matching first inner thread having the first thread direction. The drive feature may be required for locking and unlocking the adjusting element in the first inner thread, as previously explained in combination with the threadless portion adjacent to the lower side of the flange. For this reason, the drive feature may be arranged at or adjacent to the first axial end. Further, the drive feature has a structure which allows a form-fit connection to the respective tool. The presence of a separate drive feature adapted to a form-fit connection with a tool is a first difference with respect to the prior art. No separate drive feature which may be adapted to a form-fit connection and provided at the first axial end is required in the prior art.

The structure of the adjusting element in the interior, i.e. at the radial inner side of the hollow-cylindrical body, differs from the known adjusting elements which may be with respect to the portion in which the dragging element is to be received. In the following, this portion will be referred to as dragging element receiving portion or, shortly, receiving portion or chamber.

In the receiving portion, the at least one radially inwardly extending protrusion is provided which is adapted to the form-fit connection with the dragging element to be received or inserted. For this reason, the at least one radially inwardly extending protrusion may extend parallel to the longitudinal axis of the adjusting element. An example for such a protrusion is a web extending parallel to the longitudinal axis at the inner side of the hollow-cylindrical body and having a limited circumferential extension. A dragging element inserted into the receiving portion will, thus, be prevented from completely rotating in the receiving portion relative to the adjusting element, for example by the edges of the exemplary web. Accordingly, the at least one radially inwardly extending protrusion may also be denoted as rotation-inhibiting feature. Concerning the construction of the dragging element, we refer to the below discussion of a respective dragging element in a further embodiment of the adjusting element.

Further, the receiving portion, which may be formed by a recess, comprises the at least one shoulder extending circumferentially at the radial inner side and providing an axial limitation. The portion adjacent to the receiving portion may have an inner diameter which is only slightly larger than an outer diameter of a fastening screw extending later through the adjusting element. A technical effect of this portion is the centering of the fastening screw so that this portion is denoted as centering portion. The centering portion may have a smooth surface. The shoulder, thus, is present at the transition from the centering portion to the receiving portion. This is due to the fact that the inner diameter of the centering portion is only slightly larger than the outer diameter of the fastening screw. In this case, the receiving portion may have a larger inner diameter for receiving the dragging element without the dragging element hindering the fastening screw from passing through the adjusting element.

A technical effect of the at least one shoulder is, thus, to provide a stop or limitation for the dragging element to be inserted, i.e. an axial anti-loss protection by means of a form-fit connection with the dragging element. The shoulder may be formed by an all-round extending shoulder or by an all-round extending step, although other structures realizing the general function are conceivable. For example, the shoulder may not extend all-round but may be interrupted. Also, the function may be realized by the shoulder formed as a tapering between the receiving portion and the centering portion.

Finally, the adjusting element is made of metal and formed in one piece. Accordingly, the adjusting element may be manufactured by a cold-forming or cold-working process. This realizes that the adjusting element can be produced cost-efficiently.

With respect to the later use of the adjusting element, which includes at this time also the dragging element as separate or individual element, starting point is a first component providing a first inner thread of the first thread direction. As the adjusting element is made of metal, a direct fastening of the adjusting element in the respective first component is realizable. Thus, the alternatives are that the first inner thread is provided directly in the first component or by means of a separate element fastened in an opening of the first component, for example a blind rivet nut. In regard to the usage of a blind rivet nut, it has to be noted that the adjusting element will not be fastened together with the blind rivet nut, as it is done in the prior art. To the contrary, the adjusting element will only be screwed by means of the drive feature into the blind rivet nut after the blind rivet nut has been fastened in the opening of the first component.

Concerning the first alternative, the adjusting element is screwed by means of the drive feature into the first inner thread provided directly in the first component. This can, for example, be done at a first work site or company. If the first component with screwed in adjusting element must be transported to a second work site or company, the adjusting element may be locked in the first inner thread before transport. After transport it is accordingly unlocked by screwing the adjusting element out of the first inner thread so that a small gap exists between the lower side of the flange and the first component, as explained above.

Thereafter, the second component is arranged in a distance from the first component, wherein a second opening in the second component may be in alignment with the longitudinal axis of the adjusting element. Subsequently, a fastening screw having a second outer thread of a second thread direction opposite to the first thread direction is inserted through the first component into engagement with the dragging element. Now, the fastening screw is rotated until the flange of the adjusting element is in abutment with the second component. A further rotating of the fastening screw causes that the fastening screw is screwed into a second inner thread having the second thread direction and being provided at the second component. For example, the second inner thread may be provided by means of a nut welded to the second component or directly in the second component. As a result, a head of the fastening screw is arranged at the first component, the fastening screw extends through the first component and the adjusting element arranged at least partly therein and the fastening screw is fastened in the second inner thread at the second component. In other words, the adjusting element has been displaced in the insertion direction of the fastening screw.

With respect to the second alternative in which the first inner thread is provided by the exemplary blind rivet nut, the adjusting element is screwed by means of the drive feature into the first inner thread of the blind rivet nut. This can, for example, again be done at a first work site or company. If the first component with screwed in adjusting element must be transported to a second work site or company, the adjusting element may be locked in the first inner thread before transport. After transport it is accordingly unlocked by screwing the adjusting element out of the first inner thread so that a small gap exists between the lower side of the flange and the first component, as explained above.

Thereafter, the second component is arranged in a distance from the first component, wherein a second opening in the second component may be in alignment with the longitudinal axis of the adjusting element. Subsequently, the fastening screw having a second outer thread of a second thread direction opposite to the first thread direction, is inserted through the second component into engagement with the dragging element. Now, the fastening screw is rotated until the flange of the adjusting element is in abutment with the second component. A further rotation of the fastening screw causes the fastening screw to come into engagement with the second inner thread having the second thread direction which may also be provided at the first component, by the exemplary blind rivet nut. As a result, the head of the fastening screw is arranged at the second component, the fastening screw extends through the second component and the adjusting element abutting at the second component and the fastening screw is fastened in the second inner thread at the first component. In other words, the adjusting element has been displaced opposite to the insertion direction of the fastening screw.

For the sake of completeness, it is pointed out that the above explanations with respect to the usage of a blind rivet nut as separate element applies to any case in which the first and the second inner thread are provided at or in the first component, i.e. in the component into which the adjusting element is screwed.

Thus, an advantage of the adjusting element is that it can be used in a wide variety of applications while at the same time reducing the number of separate parts required for realizing a tolerance compensation function. This may be due to the fact that the adjusting element may be made of metal, contrary to known adjusting elements which consist of plastic.

According to a further embodiment, the adjusting element comprises further a plurality of radially inwardly extending protrusions formed by a plurality of axially extending webs or ribs which may be arranged all-round in circumferential direction. In other words and in case of the all-round arrangement of the webs or ribs in the receiving portion, internal teeth are present in the receiving portion. By means of this configuration, the rotation of the dragging element relative to the adjusting element, especially in the receiving chamber, may be advantageously prevented.

The at least one radially inwardly extending protrusion of the adjusting element may be arranged adjacent to the first axial end of the hollow-cylindrical body or adjacent to the second axial end of the hollow-cylindrical body. According to the first alternative, the receiving chamber is arranged at or adjacent the same end as the flange and the centering portion is arranged at or adjacent to the second axial end. As a result, the at least one shoulder blocks an axial movement of the dragging element in the direction of the second axial end. Thus, this type of configuration may be specifically in case the fastening screw may be inserted in use from the first axial end into the adjusting element, for example in case the first inner thread is provided at the first component.

In the second alternative, the receiving chamber is arranged at or adjacent to the second axial end so that the centering portion is arranged at or adjacent the same end as the flange. Thus, the at least one shoulder blocks an axial movement of the dragging element in the direction of the first axial end so that this type of configuration may be specifically in case the fastening screw may be inserted in use from the second axial end into the adjusting element. This may be the case for example if the first inner thread is provided directly in the first component and the second inner thread is present at the second component, as discussed above.

In addition to the at least one shoulder, a further shoulder or an undercut may be provided in or adjacent to the receiving portion, which is arranged opposite to the at least one shoulder. Such an undercut or shoulder can be provided at the radially inwardly extending protrusion or separate therefrom. A distance between the at least one shoulder at the transition between receiving portion and centering portion and the further shoulder or undercut is larger than an axial extension of the dragging element to be received or inserted. In this way, the receiving portion forms a receiving chamber in which the dragging element can be held in both axial directions in a form-fit manner.

Alternatively, the adjusting element may comprise an axial extension which is at least partly deformed, for example by crimping, after the dragging element has been inserted in the receiving portion so that it provides a further stop for the dragging element in the receiving portion. Accordingly, the dragging element is secured in both axial directions in the receiving portion by a form-fit connection. Thus, no additional element is required for securing the dragging element in the receiving chamber or portion and the dragging element is protected with respect to force effects from the outside.

In any case, by means of the additional shoulder or undercut, an advantageous transport or anti-loss protection may be provided for a dragging element received in the receiving portion of the adjusting element, regardless of whether the additional shoulder is formed by a deforming of an axial extension or by any other means blocking an axial movement of the dragging element.

According to a further embodiment, the adjusting element further comprises the dragging element, such as a separate element, wherein the dragging element has at least one radially outwardly extending protrusion, which may be a plurality of radially outwardly extending protrusions, which is in engagement with the at least one radially inwardly extending protrusion at the radial inner side of the hollow-cylindrical body so that at least a complete rotation of the dragging element relative to the adjusting element is inhibited. The dragging element provides on the one hand a frictional connection to the fastening screw and is on the other hand secured against at least a complete rotation in the receiving portion relative to the adjusting element by a form-fit connection so that it reliably ensures that a rotation of the screw is transmitted to the adjusting element.

With respect to the dragging element, it is advantageous to provide the dragging element with two end sides in circumferential direction and/or to form the dragging element of a spring plate. Thus, when viewed from above or below, there exists a gap in the wall forming the dragging element. By means of this gap, the dragging element is variable so that it can be slightly compressed for inserting into the receiving chamber or portion of the adjusting element. On the other hand, it may be slightly extended by a fastening screw entering the dragging element. The advantage of the usage of a spring plate for the dragging element is that the dragging element may be reutilized due to the usage of a metal for the spring element. Further, no separate securing means for retaining the dragging element in the receiving portion are necessary because of the construction of the adjusting element used.

In a further embodiment of the adjusting element comprising the dragging element, wherein the dragging element has two end sides in circumferential direction, the at least one radially outwardly extending protrusion of the dragging element is arranged at a distance from the end sides in circumferential direction. This design allows that a generally circle-like configuration of the dragging element, when viewed from above, may be used. For ensuring the frictional connection to the fastening screw, dragging arms may be provided, as it is known in the prior art.

Further, and again with respect to the adjusting element comprising the dragging element, wherein the dragging element has two end sides in circumferential direction, it is advantageous that at least one end side, which may be both end sides, comprises the at least one radially outwardly extending protrusion. In combination with the dragging element being formed of a spring plate, this design may be easily produced and is, thus, cost-efficient. Further, and especially when each end side has a protrusion, these protrusions prevent a rotation of the dragging element in opposite rotational directions relative to the adjusting element.

Additionally, the end sides of the adjusting element comprising the dragging element may be arranged in an overlapping manner in circumferential direction. This configuration can be produced by stamping or punching the dragging element from a spring plate and then bending it into the desired configuration. Due to the resulting symmetric design of the dragging element, the assembly procedure, i.e. the inserting of the dragging element into the adjusting element, is simplified. As each end side has a protrusion and the protrusions prevent a rotation of the dragging element in opposite rotational directions relative to the adjusting element, the orientation of the dragging element when inserting it is not relevant.

Finally, the dragging element may comprise a plurality of edges, which may be due to a triangular shape of the dragging element when viewed from above. This kind of configuration provides, due to the edges, an additional support structure which realizes an additional form-fit connection with the radially outwardly extending protrusions at the inner side of the hollow cylindrical body. Thus, the rotation-inhibiting effect is increased compared to an embodiment without such a structure. Further, the edges may be connected to each other by means of a convex portion or a plurality of angled straight portions in circumferential direction. Due to this, no dragging arms are required as the edges are connected by a convex portion which realizes the dragging function.

In a further embodiment of the adjusting element, the drive feature may be arranged adjacent to the first axial end of the hollow cylindrical body and is an inner drive feature, which may be a hexagon socket, and/or an outer drive feature, which may be a hexagon head. By means of these features, as discussed above, a form-fit connection of the adjusting element and the tool used for rotating the adjusting element, i.e. for initially installing the adjusting element, is achieved.

A dragging element for an adjusting element for compensating a tolerance in the distance between a first and a second component, which may be for an adjusting element, comprises: two end sides in circumferential direction and at least one radially outwardly extending protrusion, which may be a plurality of radially outwardly extending protrusions, for a form-fit connection to an adjusting element so that a rotation of the dragging element relative to the adjusting element is inhibited, wherein at least one of the following features is realized: the radially outwardly extending protrusion is arranged at a distance from the end sides in circumferential direction, the end sides are arranged in an overlapping manner in circumferential direction, or the dragging element comprises a plurality of edges, which may be due to a triangular shape of the dragging element when viewed from above. By means of this dragging element, the above explained advantages with respect to the adjusting element having the dragging element can be achieved. Thus, it is referred to the above passages for avoiding repetitions.

In an embodiment of the dragging element, at least one end side, which may be both end sides, comprises the radially outwardly extending protrusion. In a further embodiment, the dragging element is formed of a spring plate. With respect to both embodiments, it is also referred to the above explanations.

A manufacturing method of the dragging element comprises the steps of: providing a spring plate and forming the dragging element from the spring plate, for example by stamping or punching and subsequent bending. By means of this procedure, the dragging element can be produced so that it is again referred to the above discussion to avoid repetitions.

Further, the present disclosure provides a first component providing a first inner thread of a first thread direction, wherein an adjusting element is screwed into the first inner thread and the adjusting element comprises the dragging element as a separate element. The respective first component, thus, uses the adjusting element. The resulting technical effects and advantages are described in detail above in combination with the adjusting element.

In a further embodiment of the first component, the first inner thread may be provided directly in the first component or by means of a separate element fastened in an opening of the first component, wherein the separate element may be a blind rivet nut. These embodiments have also been discussed above in combination with the adjusting element so that it is referred to the above discussion.

A first alternative of a connection structure comprises the first component and a second component arranged at a distance to the first component as well as a fastening screw, wherein the first inner thread is provided directly in the first component and a second inner thread of a second thread direction opposite to the first thread direction is provided at the second component so that the fastening screw extends through the first component and the adjusting element arranged at least partly therein and is fastened in the second inner thread at the second component.

A second alternative of a connection structure comprises the first component and a second component arranged at a distance to the first component as well as a fastening screw, wherein the first inner thread and a second inner thread is provided at the first component, which may be by means of a separate element like a blind rivet nut fastened in an opening of the first component, so that the fastening screw may extend through the second component and the adjusting element abutting at the second component and is fastened in the second inner thread at the first component.

Both alternative connection structures have been discussed in detail with respect to the use of the adjusting element. Due to this, it is again referred to the corresponding passages above with respect to the technical effects and the resulting advantages.

A manufacturing method for manufacturing the adjusting element comprises the step: cold-forming or cold-working an adjusting element having the features of the embodiment. By means of this manufacturing method, the adjusting element may be produced. Regarding the resulting technical effects and advantages, we refer to the above explanations to avoid repetitions.

The manufacturing method comprises the further steps: providing a spring plate and forming a dragging element from the spring plate as well as inserting the formed dragging element into the interior of the adjusting element. By means of these steps, the required dragging element is produced, which may be from a spring plate. This dragging element may have the features of the dragging element as discussed above in combination with the adjusting element.

A connection method for connecting a first and a second component with a distance therebetween comprises the following steps: providing a first component and inserting a fastening screw through the first component into engagement with the dragging element, rotating the screw until the flange of the adjusting element is in abutment with the second component and screwing the fastening screw into a second inner thread having a second thread direction opposite to the first thread direction and being provided at the second component or inserting a fastening screw through the second component into engagement with the dragging element, rotating the screw until the flange of the adjusting element is in abutment with the second component and screwing the fastening screw into a second inner thread having a second thread direction opposite to the first thread direction and being provided at the first component. By means of the above connection method alternatives, the above discussed connection structures may be produced. Regarding the resulting technical effects and advantages, it is thus referred to the passages relating to the connection structures to avoid redundancies.

According to a further embodiment of the connection method, the step of providing the first component includes the steps of: providing an adjusting element including a dragging element as separate element and screwing the adjusting element by means of the drive feature into a first inner thread having a first thread direction and being provided at the first component.

4. BRIEF DESCRIPTION OF THE DRAWINGS

Figure 2:
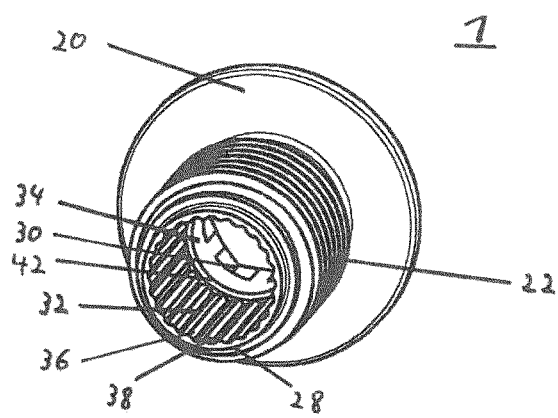
Figure 3:
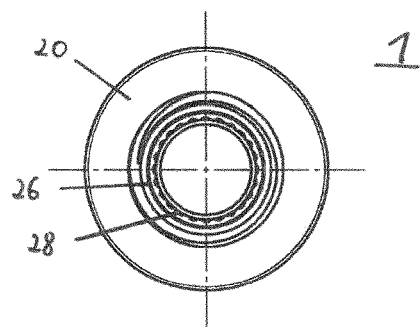
Figure 4:
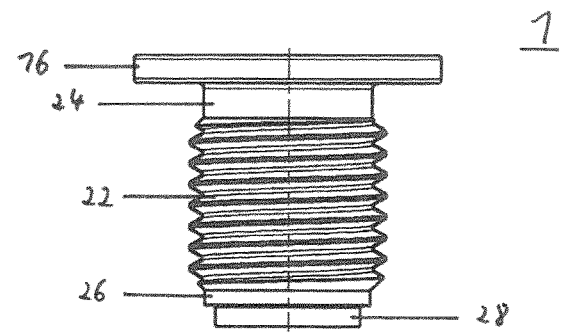
Figure 5:
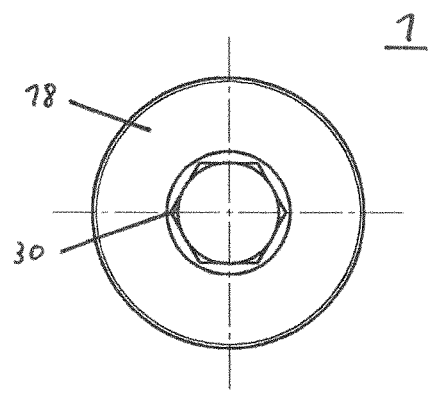
Figure 6:
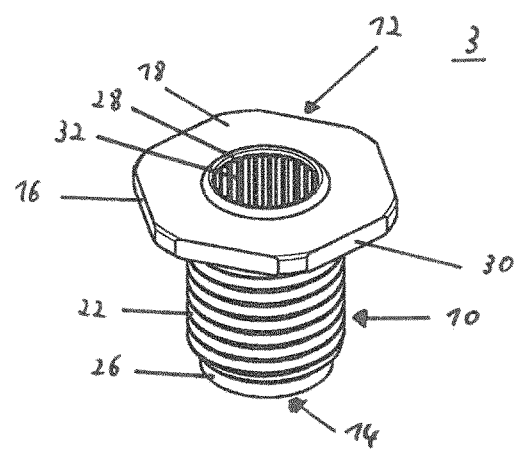
Figure 7:
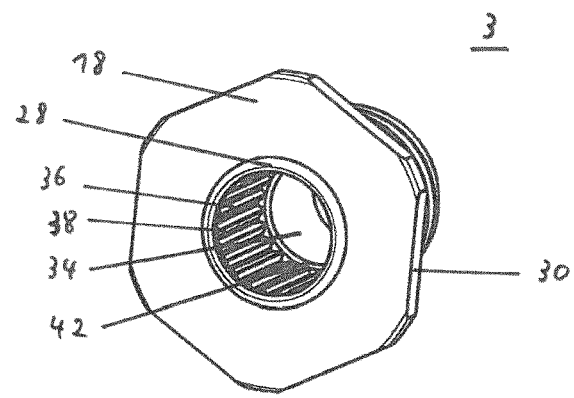
Figure 8:
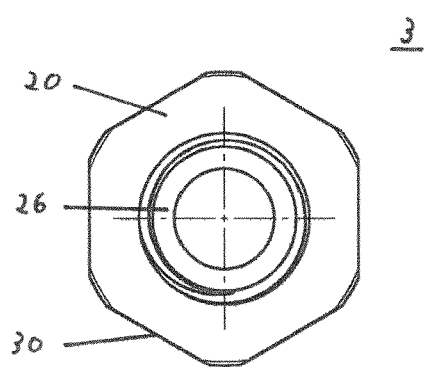
Figure 9:
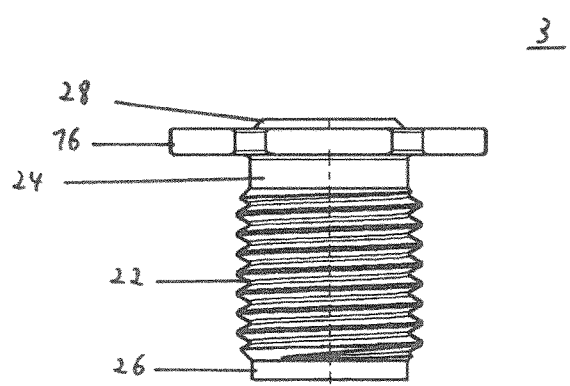
Figure 10:
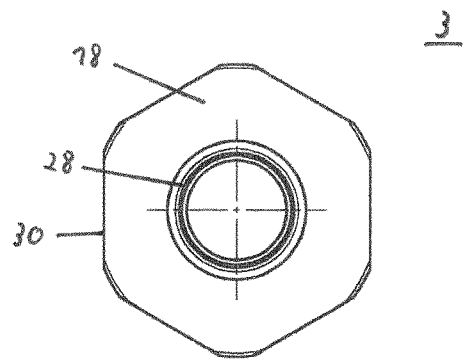
Figure 11:
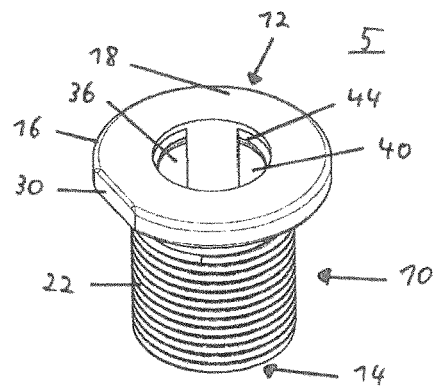
Figure 12:
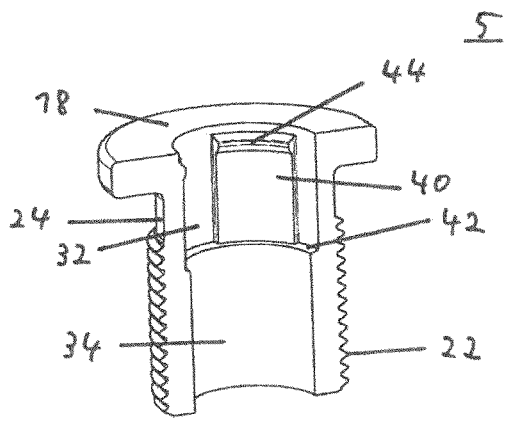
Figure 13:
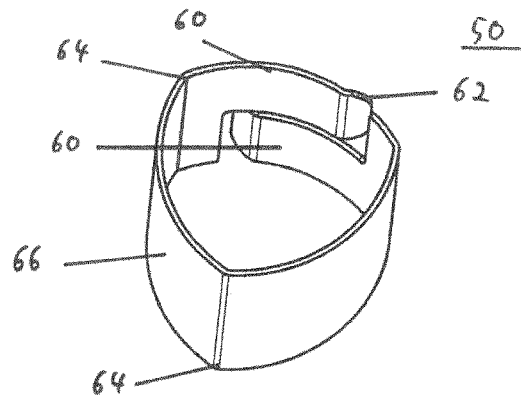
Figure 14:
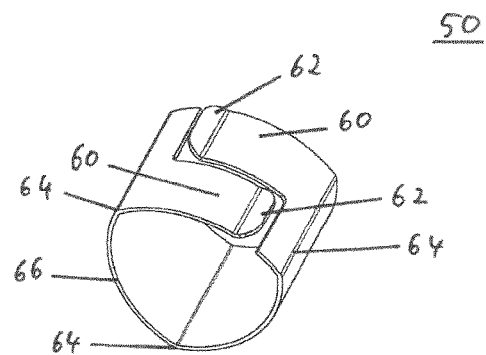
Figure 15:
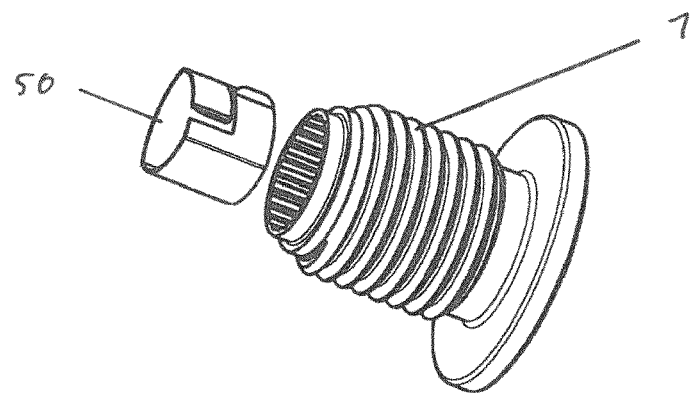
Figure 19:
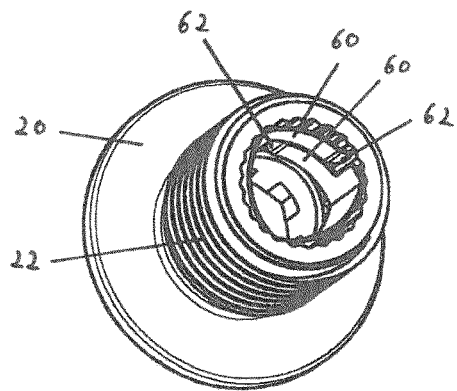
Figure 20:
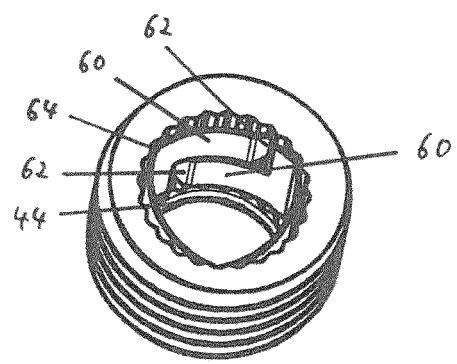
Figure 21:
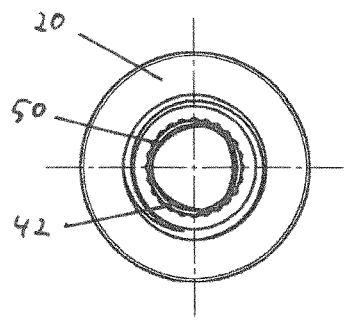
Figure 22:
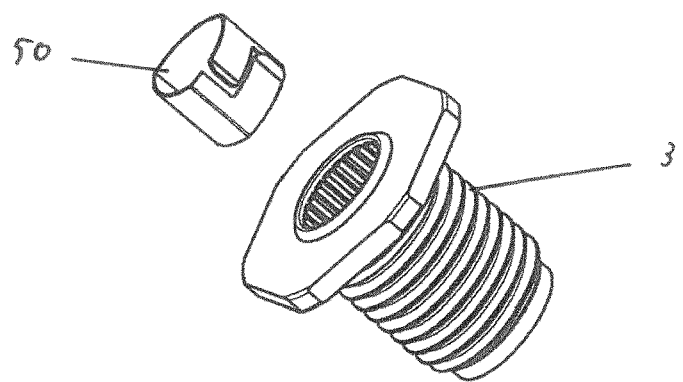
Figure 23:
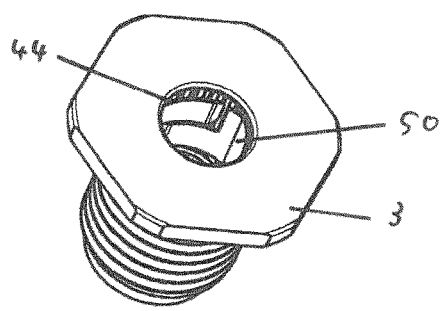
Figures 24A, 24B:
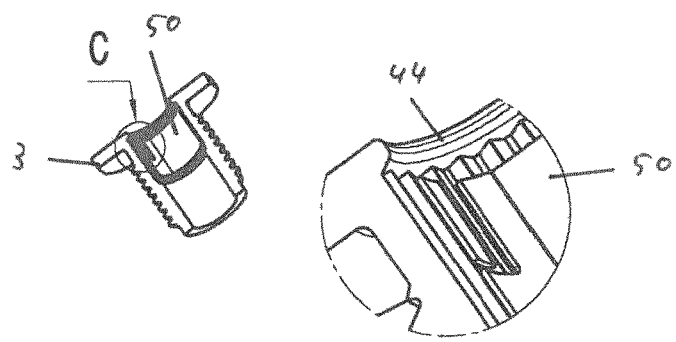
Figure 25:
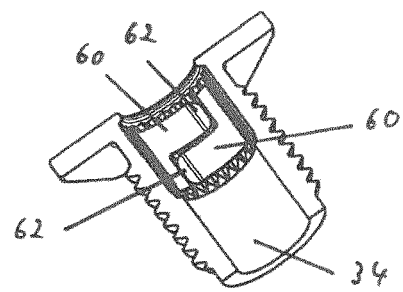
Figure 26:
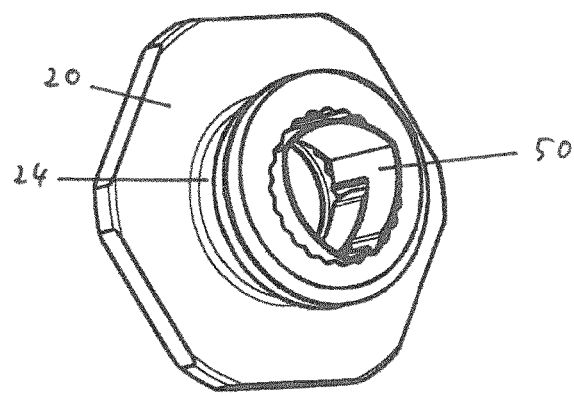
Figures 27A, 27B:
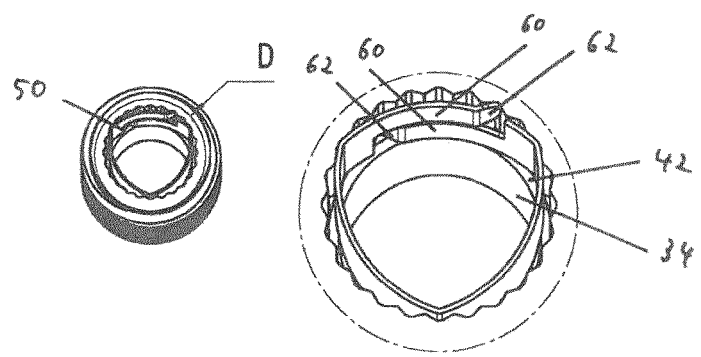
Figure 28:
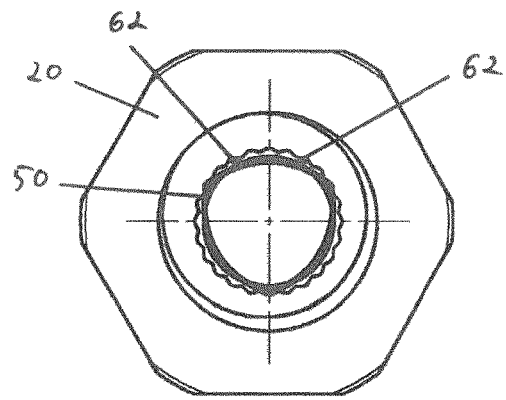
Figure 29:
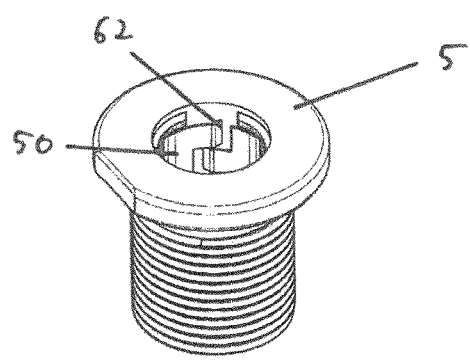
Figure 30:
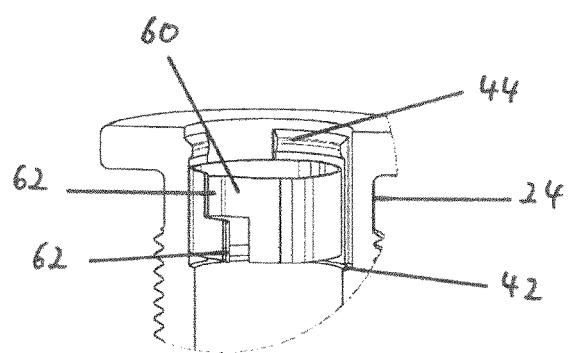
Figure 31:
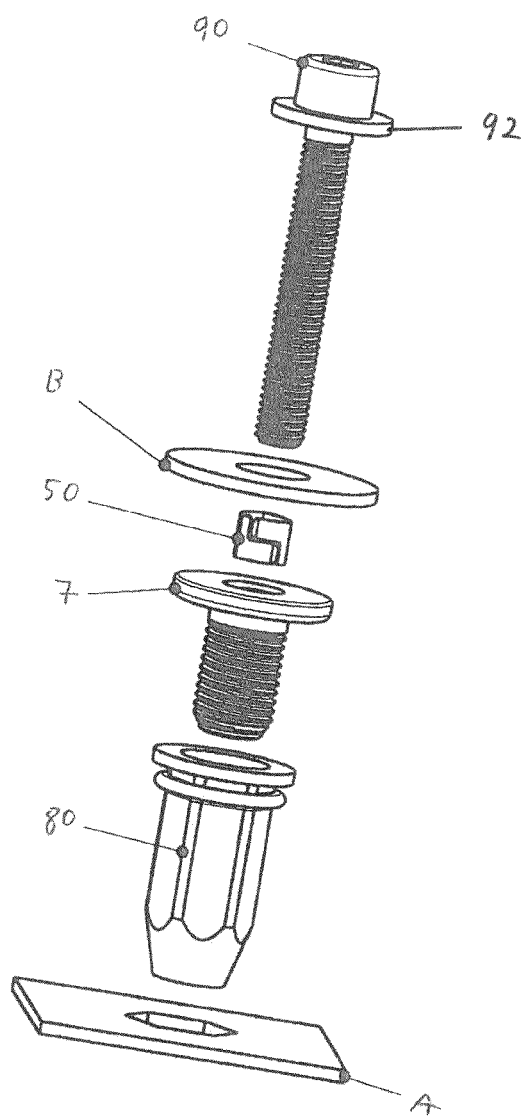
Figure 32:
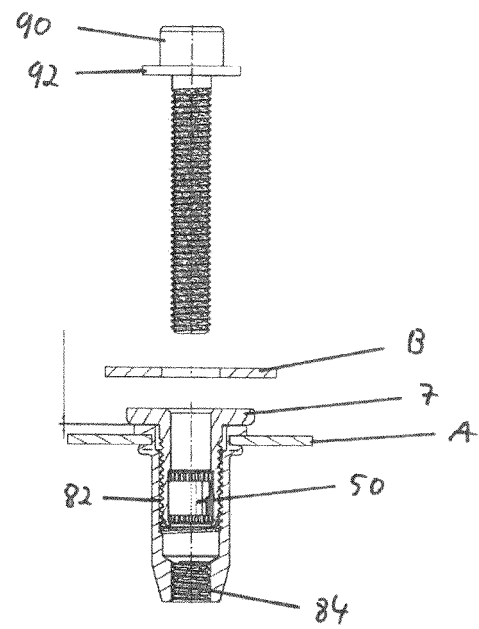
Figure 33:
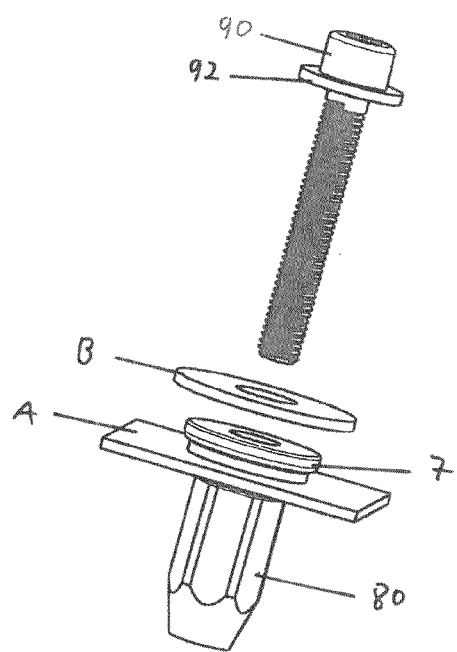
Figure 34:
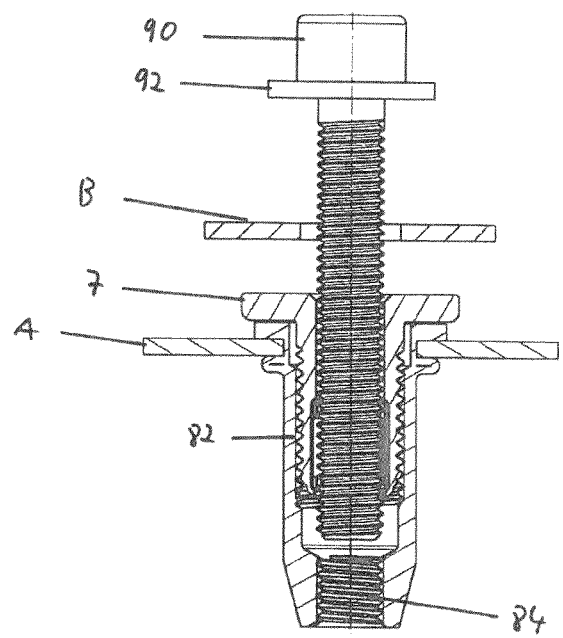
Figure 35:
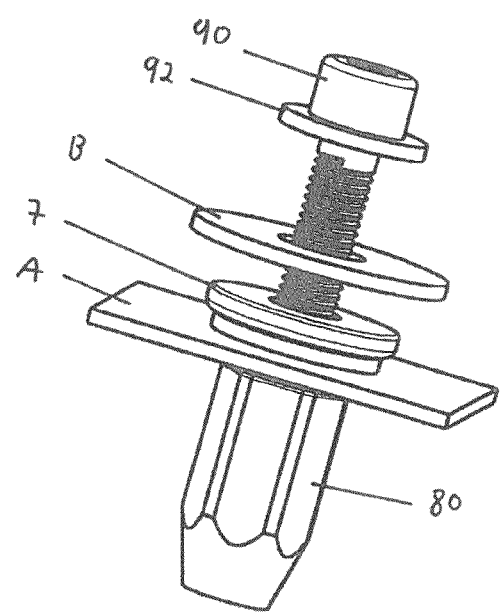
Figure 36:
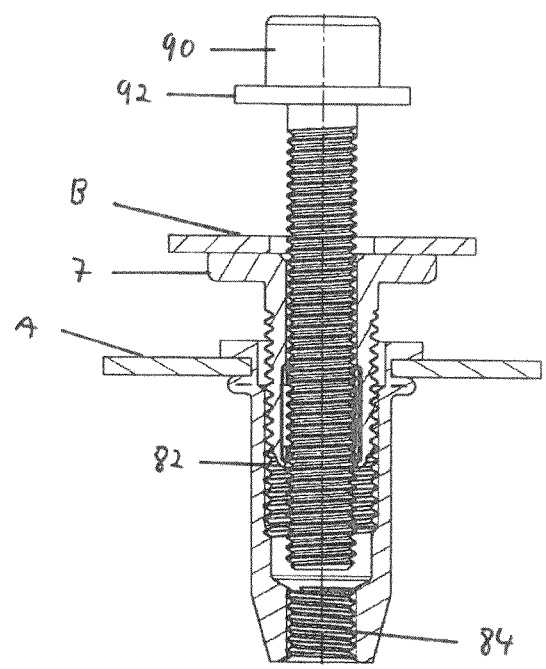
Figure 37:
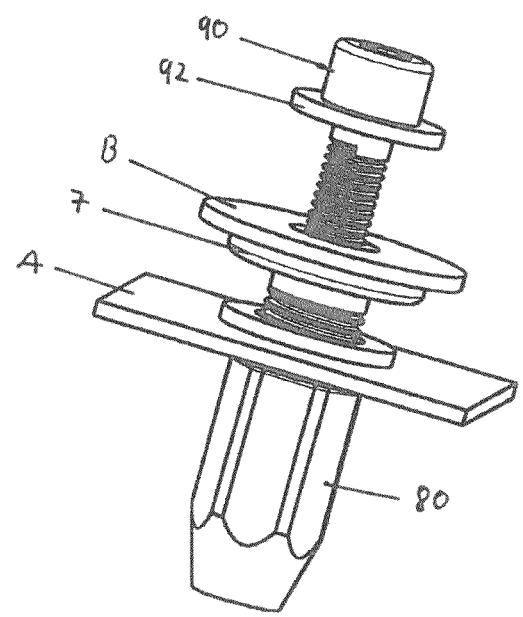
Figure 38:
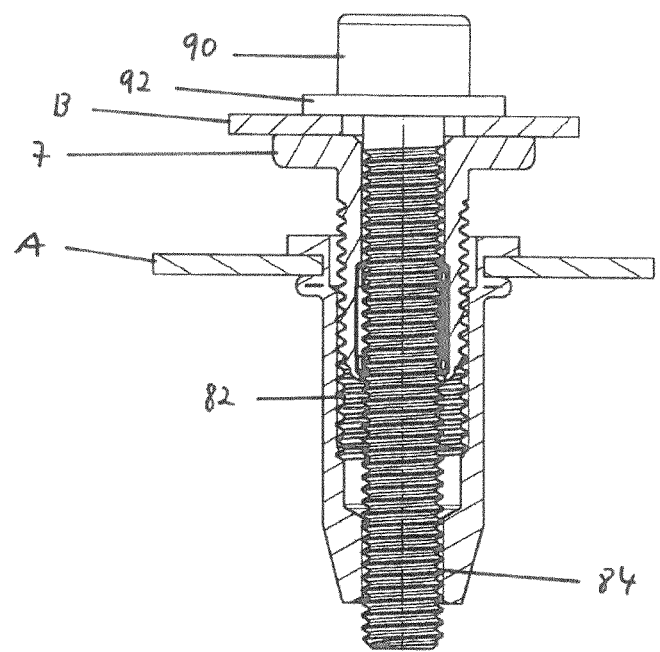
Figure 39:
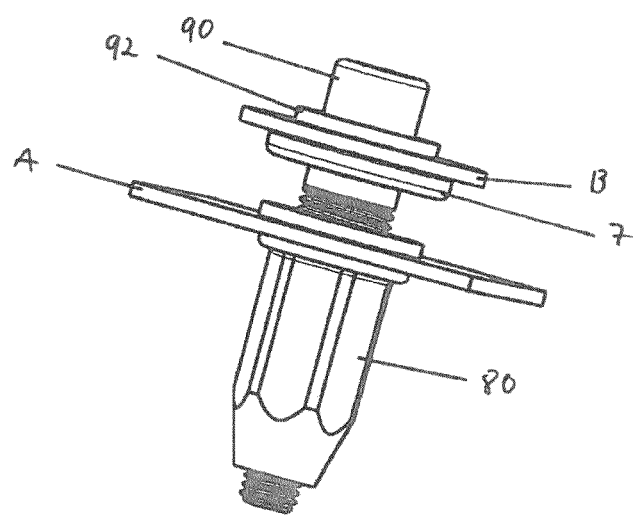
Figure 40:
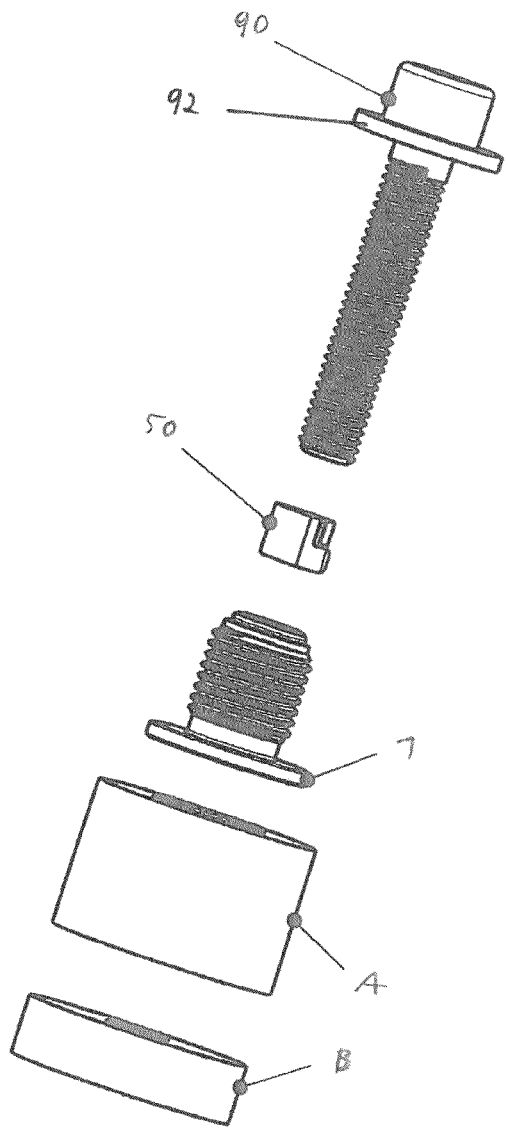
Figure 41:
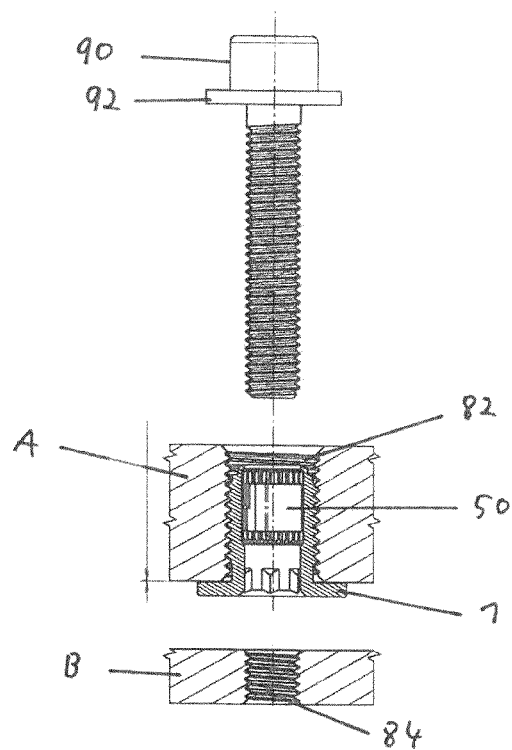
Figure 42:
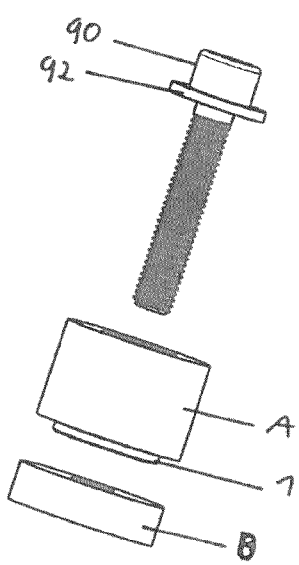
Figure 43:
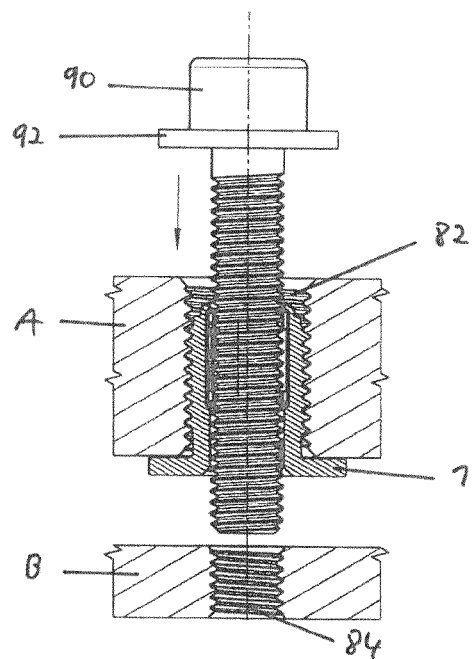
Figure 44:
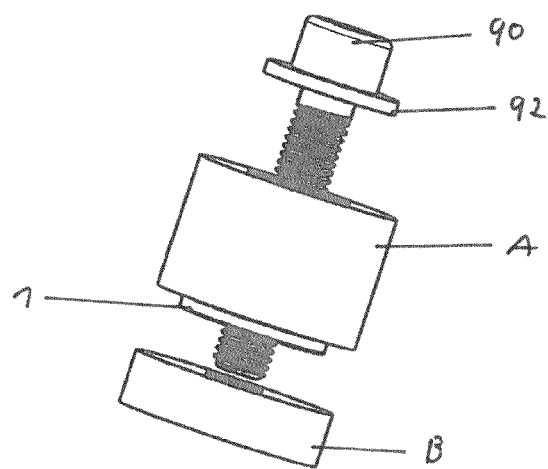
Figure 45:
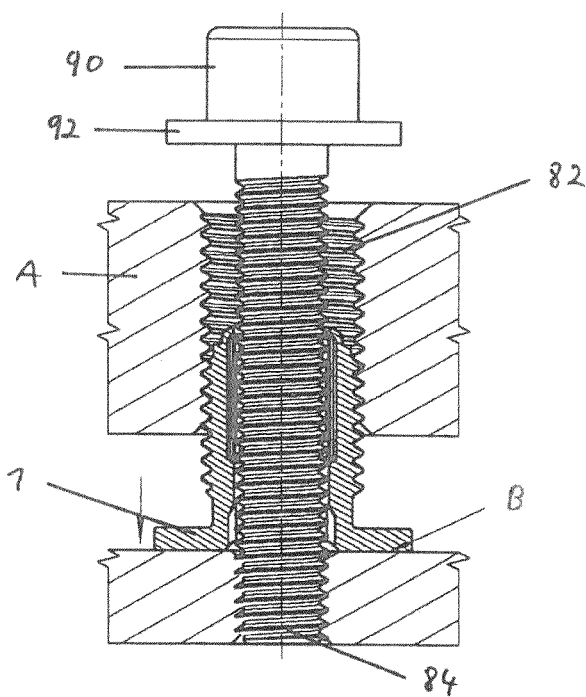
Figure 46:
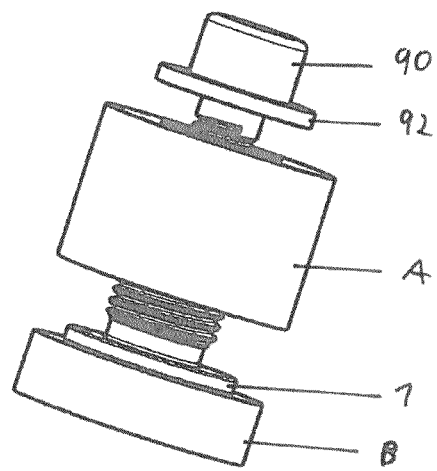
Figure 47:
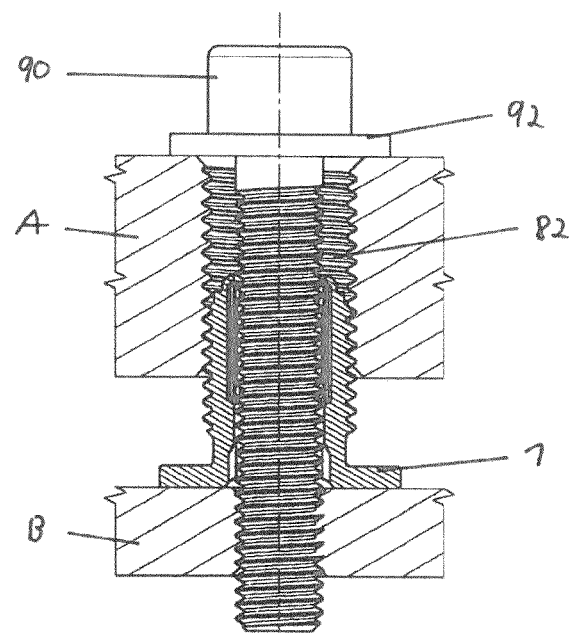
Figure 48:
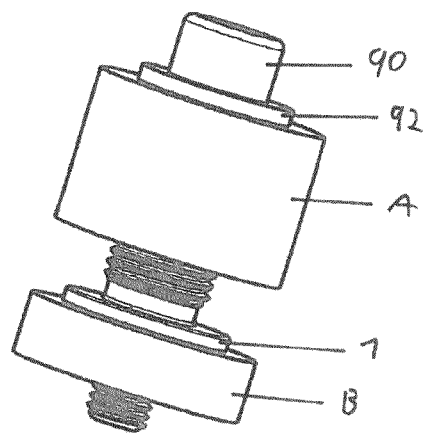
Figure 49:
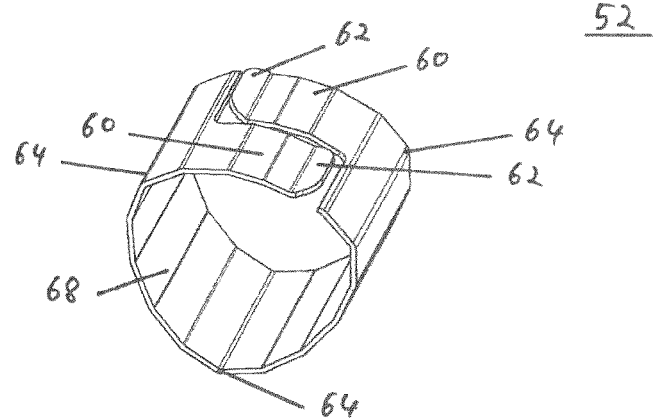
Figure 50:
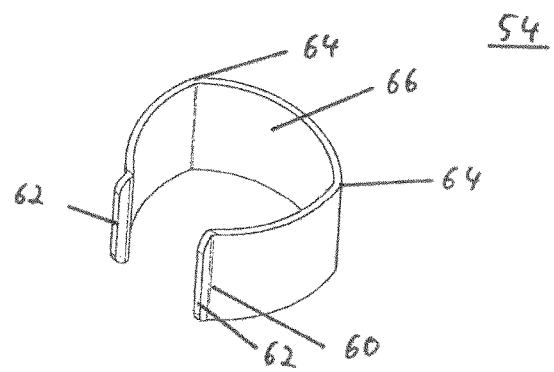
Figure 51:
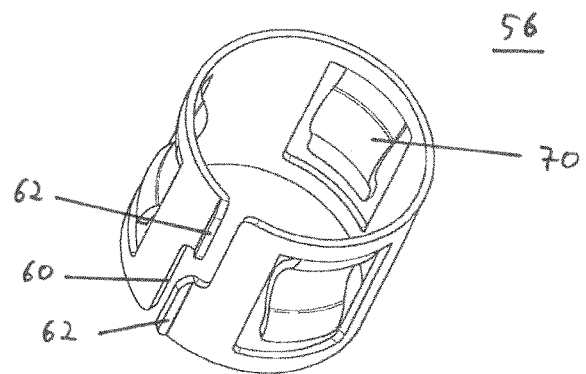
Figure 52:
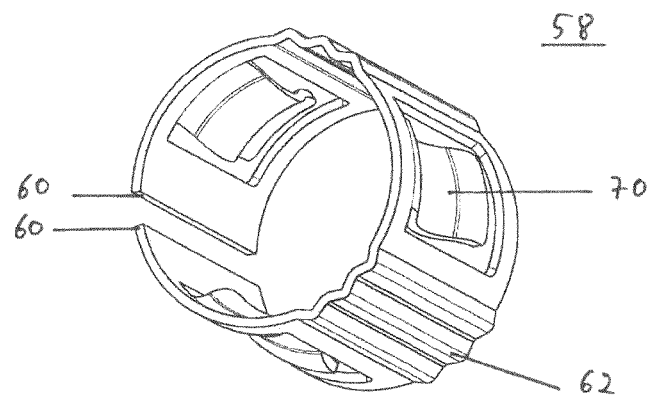
Figure 53:
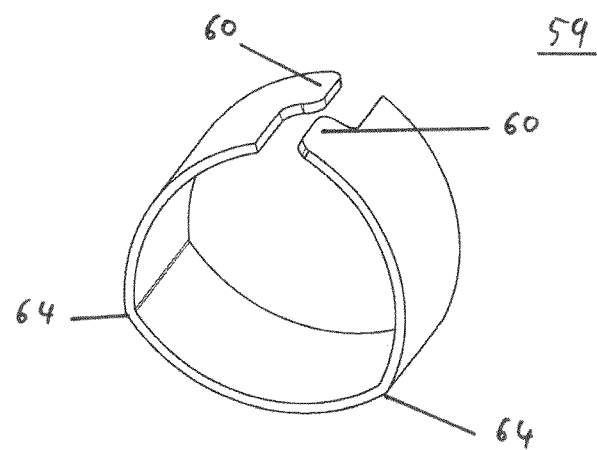
Figure 54:
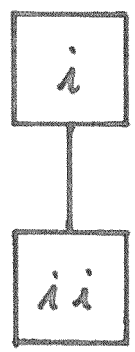
Figure 55:
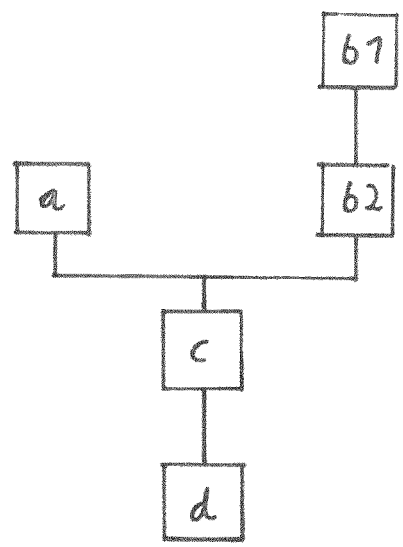
Figure 56:
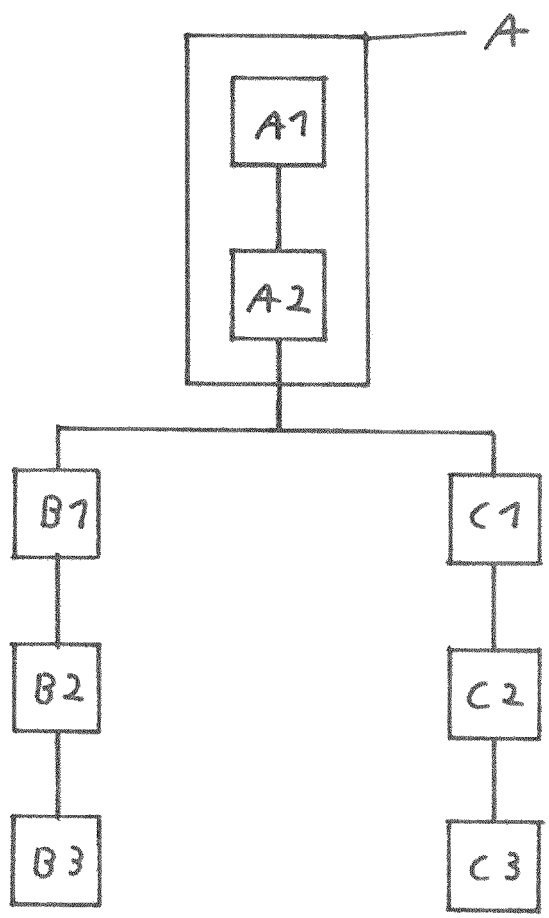

In the following, the present disclosure will be described in detail based on the drawings. In the drawings, the same reference signs denote the same elements and/or components. It shows:

FIG. 1 a perspective view of a first embodiment of the adjusting element from the top, FIG. 2 a perspective view of the adjusting element according to FIG. 1 from the bottom, FIG. 3 a bottom view of the adjusting element of FIG. 1, FIG. 4 a side view of the adjusting element of FIG. 1, FIG. 5 a top view of the adjusting element of FIG. 1, FIG. 6 a perspective view of a second embodiment of the adjusting element from the top, FIG. 7 another perspective view of the adjusting element according to FIG. 6 from the top, FIG. 8 a bottom view of the adjusting element of FIG. 6, FIG. 9 a side view of the adjusting element of FIG. 6, FIG. 10 a top view of the adjusting element of FIG. 6, FIG. 11 a perspective view of a third embodiment of the adjusting element from the top, FIG. 12 a sectional view of the adjusting element according to FIG. 11, FIG. 13 a first perspective view of a first embodiment of dragging element, FIG. 14 a second perspective view of the dragging element according to FIG. 13, FIG. 15 a perspective view of the adjusting element of FIG. 1 in combination with the dragging element of FIG. 13, FIG. 16a a perspective view of the adjusting element of FIG. 1 with inserted dragging element of FIG. 13, FIG. 16b an enlarged view of the encircled portion A of FIG. 16a, FIG. 17a a sectional view of the adjusting element with inserted dragging element of FIG. 16a at the second axial end, FIG. 17b an enlarged view of the encircled portion B of FIG. 17a, FIG. 18 a sectional view of the adjusting element with inserted dragging element of FIG. 16a, FIG. 19 a perspective sectional view of the adjusting element with inserted dragging element of FIG. 16a, FIG. 20 an enlarged perspective sectional view of the adjusting element of FIG. 16a, FIG. 21 a bottom sectional view of the adjusting element of FIG. 16a, FIG. 22 a perspective view of the adjusting element of FIG. 6 in combination with the dragging element of FIG. 13, FIG. 23 a perspective view of the adjusting element of FIG. 6 with inserted dragging element of FIG. 13, FIG. 24a a sectional view of the adjusting element with inserted dragging element of FIG. 23 at the first axial end, FIG. 24b an enlarged view of the encircled portion C of FIG. 24a, FIG. 25 a sectional view of the adjusting element with inserted dragging element of FIG. 23, FIG. 26 a perspective sectional view of the adjusting element with inserted dragging element of FIG. 23, FIG. 27a an enlarged perspective sectional view of the adjusting element of FIG. 23, FIG. 27b an enlarged view of the encircled portion D of FIG. 27a, FIG. 28 a bottom sectional view of the adjusting element of FIG. 23, FIG. 29 a perspective view of the adjusting element of FIG. 11 with inserted dragging element of FIG. 13, FIG. 30 a sectional view of a part of the adjusting element with inserted dragging element of FIG. 29, FIG. 31 an exploded view of a first embodiment of a connection structure comprising a fourth embodiment of the adjusting element in combination with the dragging element of FIG. 13, a blind rivet nut and a fastening screw, FIG. 32 a partial sectional view of the connection structure of FIG. 31 with mounted blind rivet nut, FIG. 33 a perspective view of the connection structure of FIG. 32, FIG. 34 a partial sectional view of the connection structure of FIG. 31 with fastening screw in engagement with the dragging element and the adjusting element being in the initial state, FIG. 35 a perspective view of the connection structure of FIG. 34, FIG. 36 a partial sectional view of the connection structure of FIG. 31 with fastening screw in engagement with the dragging element and the adjusting element being in abutment at the second component, FIG. 37 a perspective view of the connection structure of FIG. 36, FIG. 38 a partial sectional view of the connection structure of FIG. 31 with fastening screw in engagement with the dragging element and the fastening screw being screwed tight, FIG. 39 a perspective view of the connection structure of FIG. 38, FIG. 40 an exploded view of a second embodiment of a connection structure comprising the first embodiment of the adjusting element of FIG. 1 in combination with the dragging element of FIG. 13 and a fastening screw, FIG. 41 a partial sectional view of the connection structure of FIG. 40 with mounted adjusting element, FIG. 42 a perspective view of the connection structure of FIG. 41, FIG. 43 a partial sectional view of the connection structure of FIG. 40 with fastening screw in engagement with the dragging element and the adjusting element being in the initial state, FIG. 44 a perspective view of the connection structure of FIG. 43, FIG. 45 a partial sectional view of the connection structure of FIG. 40 with fastening screw in engagement with the dragging element and the adjusting element being in abutment at the second component, FIG. 46 a perspective view of the connection structure of FIG. 45, FIG. 47 a partial sectional view of the connection structure of FIG. 40 with fastening screw in engagement with the dragging element and the fastening screw being screwed tight, FIG. 48 a perspective view of the connection structure of FIG. 47, FIG. 49 a perspective view of a second embodiment of a dragging element, FIG. 50 a perspective view of a third embodiment of a dragging element, FIG. 51 a perspective view of a fourth embodiment of a dragging element, FIG. 52 a perspective view of a fifth embodiment of a dragging element, FIG. 53 a perspective view of a sixth embodiment of a dragging element, FIG. 54 a schematic course of procedure of an embodiment of a manufacturing method for a dragging element, FIG. 55 a schematic course of procedure of an embodiment of a manufacturing method for an adjusting element, and FIG. 56 a schematic course of procedure of an embodiment of a connection method for connecting a first and a second component.

5. DETAILED DESCRIPTION

The adjusting element 1; 3; 5; 7 is used for compensating a tolerance in the distance between a first A and a second component B. Such distances may, for example, be present when components in the automotive sector are fastened at each other. Further, and with respect to all embodiments, the adjusting element 1; 3; 5; 7 is made of metal and formed in one piece, which may be by means of a cold-forming or cold-working process. This realizes that the adjusting element 1; 3; 5; 7 can be produced cost-efficiently.

In the following, the structure of a first embodiment of an adjusting element 1 is explained with respect to FIGS. 1 to 5. As can be seen, the adjusting element 1 comprises a hollow-cylindrical body 10 having a first 12 and a second axial end 14. At the first axial end 12 of the hollow-cylindrical body 10, a flange 16 is arranged. The flange 16 has an upper side 18 facing away from the second axial end 14 and a lower side 20 facing towards the second axial end 14. The upper 18 and the lower side 20 may be each arranged in a respective plane perpendicular to the longitudinal axis of the hollow-cylindrical body 10.

An outer thread 22 of a first thread direction is present at a radial outer side of the hollow-cylindrical body 10. The outer thread 22 is arranged adjacent to the second axial end 14 of the hollow-cylindrical body 10. Further, a first threadless portion 24 is present between the lower side 20 of the flange 16, i.e. the side of the flange 16 facing the second axial end 14, and the outer thread 22. The advantage of this first threadless portion or groove 24 is that a complete screwing in of the adjusting element 1 into a first inner thread 82 of the first component A is possible, wherein the first inner thread 82 has the first thread direction. Due to this, the adjusting element 1 can be locked in the first inner thread 82, which provides a transport security.

Furthermore, a second threadless portion 26 is present at the second axial end 14 before the outer thread 18 begins. This second threadless portion 26 has the function of a pilot portion for facilitating a screwing in of the adjusting element 1 into the first inner thread 62. Additionally, an axial extension 28 is present at the second axial end 14. This axial extension 28 has an outer diameter which is smaller than the outer diameter of the second threadless portion 26. A function of this axial extension 28 will be explained later after the interior structure of the adjusting element 1 has been discussed.

The adjusting element 1 comprises also a drive feature 30 which is arranged adjacent to the first axial end 12. Here, the drive feature 30 allows a form-fit connection to the respective tool and is an inner drive feature 30, which may be a hexagon socket. The drive feature 30 is used for screwing the adjusting element 1 into the matching first inner thread 82 having the first thread direction. Thus, a form-fit connection of the adjusting element 1 and the tool used for rotating the adjusting element 1, i.e. for initially installing the adjusting element 1, is provided.

The adjusting element 1 comprises in the interior, i.e. at the radial inner side of the hollow-cylindrical body 10, a portion in which a dragging element 50; 52; 54; 56; 58; 59 is to be received, which will be referred to as dragging element receiving portion 32 or, shortly, receiving portion or chamber 32. Further, and adjacent to the receiving portion 32, a portion is present which has an inner diameter which is only slightly larger than an outer diameter of a fastening screw 90 extending later through the adjusting element 1. A technical effect of this portion is the centering of the fastening screw 90 so that this portion is denoted as centering portion 34. In this regard, the centering portion 34 has a smooth surface.

In the receiving portion 32, at least one radially inwardly extending protrusion 36 is provided. This radially inwardly extending protrusion 36 is adapted to the form-fit connection with the dragging element 50; 52; 54; 56; 58; 59 to be received or inserted. Further, the radially inwardly extending protrusion 36 extends parallel to the longitudinal axis of the hollow-cylindrical body 10. The dragging element 50; 52; 54; 56; 58; 59 inserted into the receiving portion 32 will, thus, be prevented from completely rotating in the receiving portion 32 relative to the adjusting element 1. Accordingly, the at least one radially inwardly extending protrusion 36 may also be denoted as rotation-inhibiting feature.

In the first embodiment of the adjusting element 1, a plurality of radially inwardly extending protrusions 36 is present and is formed by a plurality of axially extending ribs 38. These axially extending ribs 38, which extend parallel to the longitudinal axis of the hollow-cylindrical body 10, are arranged all-round in circumferential direction. In other words, by means of these ribs 38 in the receiving portion 32, internal teeth or a knurling is present. With respect to the knurling, and as the ribs 38 extend axially, the grooves between the ribs 38 extend parallel to the longitudinal axis of the hollow-cylindrical body 10. By means of this configuration, a rotation of the dragging element 50; 52; 54; 56; 58; 59 in the receiving chamber 32 relative to the adjusting element 1 may be advantageously prevented.

Further, the receiving portion 32, which is formed by a recess, comprises an axial limitation in the form of one shoulder 42 extending circumferentially at the radial inner side. The shoulder 42 is present at the transition from the centering portion 34 to the receiving portion 32. This is due to the fact that the inner diameter of the centering portion 34 is only slightly larger than the outer diameter of the fastening screw 90. In this case, the receiving portion 32 has a larger inner diameter for receiving the dragging element 50; 52; 54; 56; 58; 59 so that the dragging element 50; 52; 54; 56; 58; 59 does not hinder the fastening screw 90 from passing through the adjusting element 1.

A technical effect of the shoulder 42 is, thus, to provide a stop or limitation for the dragging element 50; 52; 54; 56; 58; 59 to be inserted, i.e. an axial anti-loss protection by means of a form-fit connection with the dragging element 50; 52; 54; 56; 58; 59. In the present embodiment, the shoulder 42 is formed by an all-round extending step, although other structures realizing the general function are conceivable. For example, the shoulder 42 may not extend all-round but may be interrupted. Also, the function may be realized by a tapering between the receiving portion 32 and the centering portion 34.

As can be seen in the embodiment of the adjusting element 1 according to FIGS. 1 to 5, the receiving portion 32 and, thus, the plurality of ribs 38, is arranged adjacent to the second axial end 14 of the hollow-cylindrical body 10. Accordingly, the centering portion 34 is arranged at or adjacent the same end as the flange 16, here the first axial end 12. Due to this arrangement, the shoulder 42 blocks an axial movement of the dragging element 50; 52; 54; 56; 58; 59 in the direction of the first axial end 12.

For blocking a movement of the dragging element 50; 52; 54; 56; 58; 59 in the opposite axial direction, the axial extension 22 may be at least partly deformed, for example by crimping or by applying a punch, after the dragging element 50; 52; 54; 56; 58; 59 has been inserted in the receiving portion 32 so that it provides a further stop for the dragging element 50; 52; 54; 56; 58; 59 in the receiving portion 32. Accordingly, the dragging element 50; 52; 54; 56; 58; 59 is secured in both axial directions in the receiving portion 32 by a form-fit connection. Thus, no additional element is required for securing the dragging element 50; 52; 54; 56; 58; 59 in the receiving chamber or portion 32 and the dragging element 50; 52; 54; 56; 58; 59 is protected with respect to force effects from the outside.

Now referring to FIGS. 6 to 10, a second embodiment of an adjusting element 3 is discussed. Like the first embodiment, the second embodiment comprises the hollow-cylindrical body 10 having in general the same structure. For an easier understanding, the differences in view of the first embodiment of the adjusting element 1 will be discussed in the following.

First of all, and with respect to the flange 16 and the drive feature 30, the drive feature 30 of the second embodiment of the adjusting element 3 is an outer drive feature 30, which may be a hexagon head. In the second embodiment of the adjusting element 3, too, the drive feature 30 allows a form-fit connection to the respective tool. Accordingly, the drive feature 30 is used for screwing the adjusting element 1 into the matching first inner thread 82 having the first thread direction. Thus, a form-fit connection of the adjusting element 3 and the tool used for rotating the adjusting element 3, i.e. for initially installing the adjusting element 3, is provided.

Regarding the structure in the interior of the adjusting element 3, the position of the receiving portion 32 and of the centering portion 34 are reversed compared to the first embodiment of the adjusting element 1. Thus, the receiving portion 32, which is formed by a recess, is arranged adjacent to the first axial end 12 and the centering portion 34 is arranged adjacent to the second axial end 14. As a result, the plurality of radially inwardly extending protrusions 36, here the ribs 38, of the adjusting element 3 is arranged adjacent to the first axial end 12 of the hollow-cylindrical body 10. Accordingly, the receiving chamber 32 is arranged at or adjacent the same end as the flange 16 and the centering portion 34 is arranged at or adjacent to the second axial end 14. As a result, the shoulder 42 blocks an axial movement of the dragging element 50; 52; 54; 56; 58; 59 in the direction of the second axial end 14.

Finally, the axial extension 28 is arranged at the first axial end 12 in the adjusting element 3 according to the second embodiment. As discussed above with respect to the first embodiment, the axial extension 28 may be deformed after the dragging element 50; 52; 54; 56; 58; 59 has been inserted into the receiving portion 32 for blocking an axial movement of the dragging element 50; 52; 54; 56; 58; 59. In the second embodiment of the adjusting element 3, the blocking will occur in case of a movement of the dragging element 50; 52; 54; 56; 58; 59 in the direction of the first axial end 12.

FIGS. 11 and 12 show a third embodiment of an adjusting element 5. Here, the general structure corresponds to the first and second embodiment so that again the differences are highlighted in the following.

As can be seen from FIG. 11, the drive feature 30 may be an outer drive feature 30. Nevertheless, it is not in the form of a hexagonal head, as it is the case for the second embodiment, but in the form of a flat section at the radially outer side of the flange 16. In this regard, it may be stressed that any non-round feature allowing a for-fit connection to a respective tool may suffice as drive feature, regardless of whether it is arranged at the outside or at the inner side.

At the radially inner side of the hollow-cylindrical body 10, a plurality of webs 40, which may be three webs 40, is provided which represent a plurality of radially inwardly extending protrusions 36. Thus, each web 40 extends parallel to the longitudinal axis at the inner side of the hollow-cylindrical body 10 and has a limited circumferential extension. The dragging element 50; 52; 54; 56; 58; 59 inserted into the receiving portion 32 is, thus, prevented from completely rotating in the receiving portion 32 relative to the adjusting element 5, specifically by the edges of the webs 40.

Further, no axial extension is present. Instead, each of the webs 40 comprises an undercut 44 as further axial limitation which is formed at the webs 40 adjacent to the first axial end 12. In other words, the undercut 44 is present at a side of the radially inwardly extending protrusions 36 opposite to the shoulder 42. In more general words, a further shoulder or undercut 44 may be provided in or adjacent to the receiving portion 32, which is arranged opposite to the at least one shoulder 42. Such an undercut 44 or further shoulder can be provided at the radially inwardly extending protrusion 36, as shown in FIGS. 11 and 12, or separate therefrom. A distance between the at least one shoulder 42 at the transition between receiving portion 32 and centering portion 34 and the further shoulder or undercut 44 is larger than an axial extension of the dragging element 50; 52; 54; 56; 58; 59 to be received or inserted. In this way, the receiving portion 32 forms a receiving chamber in which the dragging element 50; 52; 54; 56; 58; 59 can be held in both axial directions in a form-fit manner.

Next and referring to FIGS. 13 and 14, a first embodiment of a dragging element 50 is discussed. The dragging element 50 has two end sides 60 in circumferential direction and is formed of a spring plate. Thus, there exists a gap in the wall forming the dragging element 50. By means of this gap between the end sides 60, the dragging element 50 is variable so that it can be slightly compressed for inserting into the receiving chamber or portion 32 of the adjusting element 1; 3; 5; 7. On the other hand, it may be slightly extended by the fastening screw 90 entering the dragging element 50. The advantage of the usage of a spring plate for the dragging element 50 is that the dragging element 50 may be reutilized due to the usage of a metal for the spring element 50. Additionally, the design of the dragging element 50 can be easily produced and the dragging element 50 is, thus, cost-efficient.

Further, the dragging element 50 comprises two radially outwardly extending protrusions 62. One of the radially outwardly extending protrusions 62 is formed at one of the end sides 60 and the other radially outwardly extending protrusion 62 is formed on the other end side 60. As can be seen, the radially outwardly extending protrusions 62 at the end side 60 are rounded for a better insertion of the dragging element 50 into the adjusting element 1; 3; 5; 7. In use, the radially outwardly extending protrusions 62 are in engagement with the at least one radially inwardly extending protrusion 36 of the adjusting element 1; 3; 5; 7 such that at least a complete rotation of the dragging element 50 relative to the adjusting element 1; 3; 5; 7 is inhibited. Due to the bending of the end sides 60 for forming the radially outwardly extending protrusions 62, which is less than 90°, or less than 45°, the outwardly extending protrusions 62 prevent a rotation of the dragging element 50 in opposite rotational directions relative to the adjusting element 1; 3; 5; 7.

According to FIGS. 13 and 14, the end sides 60 of the dragging element 50 are arranged in an overlapping manner in circumferential direction. In other words, the gap between the end sides 60 has an S-shape. Such a configuration can be produced by stamping or punching the dragging element 50 from a spring plate and then bending it into the desired configuration. Due to the resulting symmetric design of the dragging element 50, the assembly procedure, i.e. the inserting of the dragging element 50 into the adjusting element 1; 3; 5; 7, is simplified.

Finally, the dragging element 50 comprises a plurality of edges 64, which may be due to a triangular shape of the dragging element 50 when viewed from above. Thus, the dragging element 50 has three edges 64 which each enclose an angle of 120°. Each of these edges 64 provides, depending on the design of the adjusting element 1; 3; 5; 7, a further rotation-inhibiting effect. Due to the edges 64, this kind of configuration may provide an additional support structure which realizes an additional form-fit connection with the radially outwardly extending protrusions 36 at the inner side of the hollow cylindrical body 10.

The edges 64 are connected to each other by means of a convex portion 66. As the convex portions 66 realize, in combination with the fastening screw 90 a dragging function, no separate dragging arms are required compared to the prior art.

Thus, the dragging element 50 provides on the one hand a frictional connection to the fastening screw 90 and is on the other hand secured against at least a complete rotation in the receiving portion 32 relative to the adjusting element 1; 3; 5; 7 by a form-fit connection so that it reliably ensures that a rotation of the fastening screw 90 is transmitted to the adjusting element 1; 3; 5; 7.

Now referring to FIGS. 15 to 21, the combination of the first embodiment of the adjusting element 1 with the above described dragging element 50 is explained. FIG. 15 shows in this regard an exploded view.

After the dragging element 50 has been inserted into the receiving portion 32, the axial extension 28 is deformed, as can be seen in FIGS. 16a and 16b. Thus, the dragging element 50 is held by means of a form-fit in the axial direction towards the first 12 and the second axial end 14 as well as secured against rotation relative to the adjusting element 1. With respect to the form fit in the axial direction towards the second axial end 14, it is referred to the sectional view of FIGS. 17a and 17b. FIG. 18 shows a complete sectional view of the adjusting element 1 with dragging element 50.

FIGS. 19 to 21 show the adjusting element 1 including the dragging element 50, wherein a portion of the receiving portion 32 either adjacent to the second axial end 14 (FIGS. 19 and 21) or adjacent to the centering portion 34 (FIG. 20) has been cut away. These Figures illustrate in detail how the form fit connection between the dragging element 50 and the plurality of ribs 38 is established.

FIGS. 22 to 28 show the combination of the second embodiment of the adjusting element 3 with the above described dragging element 50. FIG. 22 shows in this regard an exploded view.

Again, and after the dragging element 50 has been inserted into the receiving portion 32, the axial extension 28 is deformed, as can be seen in FIG. 23. Thus, the dragging element 50 is held by means of a form-fit in the axial direction towards the first 12 and the second axial end 14 as well as secured against rotation relative to the adjusting element 3. With respect to the form fit in the axial direction towards the second axial end 14, it is referred to the sectional view of FIGS. 24a and 24b. FIG. 25 shows a complete sectional view of the adjusting element 3 with dragging element 50.

FIGS. 26 to 28 show the adjusting element 1 including the dragging element 50, wherein a portion of the receiving portion 32 either adjacent to the centering portion 34 (FIGS. 26 and 28) or adjacent to the flange 16 (FIGS. 27a and 27b) has been cut away. These Figures illustrate for the second embodiment of the adjusting element 3 in detail how the form fit connection between the dragging element 50 and the plurality of ribs 38 is established.

The combination of the dragging element 50 with the third embodiment of the adjusting element 5 is shown in FIGS. 29 and 30. Here, a rotation of the dragging element 50 relative to the adjusting element 5 is blocked when the radially outwardly extending protrusions 62 abut at the edge of the adjacent web 40. The edges 64 of the dragging element 50 are arranged in abutment with a respective of the webs 40. The axial displacement of the dragging element 50 within the receiving portion 32 is limited on the one hand by the shoulder 42 and on the other hand by the undercut 44 being present at the opposite side of the web 40.

With respect to FIGS. 31 to 39, a first embodiment of a connection structure which uses a fourth embodiment of the adjusting element 7 is explained. The fourth embodiment of the adjusting element 7 corresponds mainly to the second embodiment of the adjusting element 3 with the exception that a different outer drive feature 30 is used.

First, a blind rivet nut 80 providing a first inner thread 82 of the first thread direction and a second inner thread of a second thread direction opposite to the first thread direction is fastened in an opening of the first component A. In this regard, it has to be pointed out that the blind rivet nut 80 is fastened in the first component A without the adjusting element 7 being screwed therein. Thus, the first inner thread 82 is provided at the first component A.

Next, the adjusting element 7 is screwed into the blind rivet nut 80 by means of a tool engaging at the drive feature 30. This can, for example, be done at a first work site or company. If the first component A with screwed in adjusting element 7 must be transported to a second work site or company, the adjusting element 7 is locked in the first inner thread before transport. This can be achieved due to the first threadless portion 24 as the adjusting element 7 can be screwed tightly into the blind rivet nut 80.

After transport, the adjusting element 7 is accordingly unlocked by screwing the adjusting element 7 out of the first inner thread 82 so that a small gap exists between the lower side 20 of the flange 16 and the first component A.

Thereafter, the second component B is arranged in a distance from the first component A, wherein a second opening in the second component is in alignment with the longitudinal axis of the adjusting element 7. This condition is shown in FIGS. 32 and 33.

Subsequently, the fastening screw 90 having a second outer thread of a second thread direction opposite to the first thread direction, is inserted through the second component into engagement with the dragging element 50. FIGS. 34 and 35 illustrate this state.

Now, the fastening screw 90 is rotated until the flange 16 of the adjusting element 7 is in abutment with the second component B, as shown in FIGS. 36 and 37.

A further rotating of the fastening screw 90 causes that the fastening screw 90 comes into engagement with the second inner thread 84 having the second thread direction which is also provided by the blind rivet nut 80. In a tightened state of the fastening screw 90, a washer 92 arranged below the head of the fastening screw 90 is arranged at the second component B. The fastening screw 90 extends through the second component B and the adjusting element 7 abutting at the second component B. In other words, the adjusting element 7 has been displaced opposite to the insertion direction of the fastening screw 90.

Now referring to FIGS. 40 to 48, a second embodiment of a connection structure which uses the first embodiment of the adjusting element 1 is explained.

Here, the adjusting element 1 with dragging element 50 is directly screwed by means of a tool engaging at the drive feature 30 into the first component A, which provides the first inner thread 82. This can, for example, be done at a first work site or company. If the first component A with screwed in adjusting element 1 must be transported to a second work site or company, the adjusting element 1 is locked in the first inner thread 82 before transport. This can be achieved due to the first threadless portion 24 as the adjusting element 1 can be screwed tightly into the first component A.

After transport, the adjusting element 1 is accordingly unlocked by screwing the adjusting element 1 out of the first inner thread 82 so that a small gap exists between the lower side 20 of the flange 16 and the first component A.

Thereafter, the second component B is arranged in a distance from the first component A, wherein a second opening in the second component B is in alignment with the longitudinal axis of the adjusting element 1. This condition is shown in FIGS. 41 and 42.

Subsequently, the fastening screw 90 having a second outer thread of a second thread direction opposite to the first thread direction, is inserted through the first component A into engagement with the dragging element 50. FIGS. 43 and 44 illustrate this state.

Now, the fastening screw 90 is rotated until the flange 16 of the adjusting element 1 is in abutment with the second component B, as shown in FIGS. 45 and 46.

A further rotating of the fastening screw 90 causes that the fastening screw 90 comes into engagement with the second inner thread 84 having the second thread direction. In this embodiment, the second inner thread 84 is provided directly by the second component B. In a tightened state of the fastening screw 90, a washer 92 arranged below the head of the fastening screw 90 is arranged at the first component A. The fastening screw 90 extends through the first component A and the adjusting element 1 abutting at the second component B. In other words, the adjusting element 1 has been displaced in the insertion direction of the fastening screw 90 and the fastening screw 90 has been fastened in the second component B.

Now referring to FIGS. 49 to 52, several further embodiments of dragging elements 52; 54; 56 and 58 are shown. In a second embodiment 52 as shown in FIG. 49, the basic structure of the dragging element 52 corresponds to the structure of the first embodiment of the dragging element 50. Nevertheless, and instead of convex portions connecting the edges 64, a plurality of angled straight portions 68 in circumferential direction have been used.

In the third embodiment as shown in FIG. 50, the dragging element 54 does not use the overlapping end sides 60. Thus, the end sides 60 are arranged opposite to each other in circumferential direction. Each end side 60 has the radially outwardly extending protrusion 62. Further, the dragging element 54 comprises two edges 64, wherein the edges and the end sides 60 are connected to each other by generally convex portions, as discussed for the first embodiment of the dragging element 50.

FIG. 51 shows a fourth embodiment of the dragging element 56. Here, the general structure is circle-like with two end sides 60. The end sides 60 overlap each other in circumferential direction, at least due to the radially outwardly extending protrusions 62. Further, dragging arms 70 are provided for realizing the dragging function.

A fifth embodiment of the dragging element 58 is shown in FIG. 52. This dragging element 58, too, has a circle-like structure and includes dragging arms 70 for realizing the dragging function. The end sides 60 are not provided with radially outwardly extending protrusions. For achieving a form fit connection with the receiving chamber 32 of the adjusting element 1; 3; 5; 7, radially outwardly extending protrusions 62 are arranged at a distance from the end sides 60 in circumferential direction.

Finally, FIG. 53 shows a sixth embodiment of the dragging element 59. The basic structure of the dragging element 59 corresponds to the structure of the first embodiment of the dragging element 50. Nevertheless, and contrary to the first embodiment, the end sides 60 are not provided with radially outwardly extending protrusions. As a result, the radially outwardly extending protrusions 62 are only provided by means of the edges 64.

A schematic course of procedure for manufacturing a dragging element 50; 52; 54; 56; 58; 59 is shown in FIG. 54. A spring plate is provided in a first step i and the dragging element 50; 52; 54; 56; 58; 59 is formed from the spring plate in a second step ii, for example by stamping or punching and subsequent bending.

In FIG. 55, a schematic course of procedure of an embodiment of a manufacturing method for an adjusting element 1; 3; 5; 7 is shown. The method comprises the step a of cold-forming or cold-working an adjusting element 1; 3; 5; 7 having the features of the embodiment. At the same time, prior to or subsequent to the first step a, a providing of a spring plate occurs in step b1 and a forming of a dragging element 50; 52; 54; 56; 58; 59 from the spring plate occurs in step b2. Thereafter, an inserting of the formed dragging element 50; 52; 54; 56; 58; 59 into the interior of the adjusting element 1; 3; 5; 7 occurs in step c. Additionally, and in case the adjusting element 1; 3; 5; 7 comprises initially an axial extension at the first 12 or second axial end 14 of the hollow-cylindrical body 10, a deforming of the axial extension 28 at least partly occurs in step d so that a further shoulder or an undercut 44 as further axial limitation is formed for retaining the dragging element 50; 52; 54; 56; 58; 59 within the adjusting element 1; 3; 5; 7. The deforming step d is performed for example by crimping or by applying a punch to a portion of the axial extension 28 which results in the desired deformation.

With respect to FIG. 56, a schematic course of procedure of an embodiment of a connection method for connecting a first A and a second component B with a distance therebetween is explained. In a first step A, the first component comprising an adjusting element 1; 3; 5; 7 screwed into the first inner thread 82 provided in or at the first component A and having a dragging element 50; 52; 54; 56; 58; 59 as separate element is provided. This step A comprises the step A1 of providing the adjusting element 1; 3; 5; 7 including a dragging element 50; 52; 54; 56; 58; 59 as separate element. Further, this first step A comprises the step A2 of screwing the adjusting element 1; 3; 5; 7 by means of the drive feature 30 into the first inner thread 82 having a first thread direction, which is provided at the first component A. Depending on the requirements, for example if the first component A with screwed in adjusting element 1; 3; 5; 7 is to be transported to a different work site or company, the adjusting element 1; 3; 5; 7 is screwed into the first inner thread 82 such that it is locked therein, as explained above. Consequently, when arriving at the different work site or company, the adjusting element 1; 3; 5; 7 must be unlocked before the method moves on.

In the following, it is differentiated whether the second inner thread 84 is provided at the first A or at the second component B. If the second inner thread 84 is provided at the second component B, the next step B1 is to insert a fastening screw 90 through the first component A into engagement with the dragging element 50; 52; 54; 56; 58; 59, rotating B2 the fastening screw 90 until the flange 16 of the adjusting element 1; 3; 5; 7 is in abutment with the second component B and screwing B3 the fastening screw 90 into the second inner thread 84 having a second thread direction opposite to the first thread direction and being provided at the second component B.

Alternatively and in case the second inner thread 84 is provided at the first component A, for example by means of the blind rivet nut 80, the fastening screw 90 is in an alternative step C1 inserted through the second component B into engagement with the dragging element 50; 52; 54; 56; 58; 59, the fastening screw 90 is rotated in step C2 until the flange 16 of the adjusting element 1; 3; 5; 7 is in abutment with the second component B and the fastening screw 90 is screwed in step C3 into the second inner thread 84 having the second thread direction opposite to the first thread direction and being provided at the first component A.

The invention claimed is:

1. An adjusting element formed in one piece and made of metal for compensating a tolerance in the distance between a first and a second component, wherein the adjusting element comprises:
   a. a hollow-cylindrical body having a radially outwardly extending flange adjacent to a first axial end and an outer thread of a first thread direction at a radial outer side,
   b. a drive feature so that the adjusting element is rotatable by a tool,
   c. a receiving portion at the radial inner side of the hollow-cylindrical body, in which a dragging element is to be received, wherein the receiving portion comprises at least one radially inwardly extending protrusion, in particular a plurality of radially inwardly extending protrusions at a radial inner side of the hollow-cylindrical body adapted to a form-fit connection with the dragging element and d. at least one shoulder extending circumferentially at the radial inner side and providing an axial limitation.

2. The adjusting element according to claim 1, comprising a plurality of radially inwardly extending protrusions formed by a plurality of axially extending ribs.

3. The adjusting element according to claim 1, wherein the at least one radially inwardly extending protrusion is arranged a. adjacent to the first axial end of the hollow-cylindrical body, or b. adjacent to the second axial end of the hollow-cylindrical body.

4. The adjusting element according to claim 1, further comprising the dragging element, wherein the dragging element has at least one radially outwardly extending protrusion which is in engagement with the at least one radially inwardly extending protrusion at the radial inner side of the hollow-cylindrical body so that at least a complete rotation of the dragging element relative to the adjusting element is inhibited.

5. The adjusting element according to claim 4, wherein the dragging element comprises two end sides in circumferential direction or is formed of a spring plate, or both.

6. The adjusting element according to claim 4, wherein the dragging element comprises two end sides in circumferential direction and at least one radially outwardly extending protrusion of the dragging element is arranged at a distance from the end sides in circumferential direction.

7. The adjusting element according to claim 4, wherein the dragging element comprises two end sides in circumferential direction and at least one end side comprises the at least one radially outwardly extending protrusion.

8. The adjusting element according to claim 4, wherein the dragging element comprises two end sides in circumferential direction and the end sides are arranged in an overlapping manner in circumferential direction.

9. The adjusting element according to claim 4, wherein the dragging element comprises a plurality of edges.

10. The adjusting element according to claim 1, wherein the drive feature is arranged adjacent to the first axial end of the hollow cylindrical body and is an inner drive feature.

11. A first component providing a first inner thread of a first thread direction, wherein an adjusting element according to claim 1 is screwed into the first inner thread and the adjusting element comprises the dragging element as a separate element.

12. The first component according to claim 11, wherein the first inner thread is provided a. directly in the first component or b. by means of a separate element fastened in an opening of the first component.

13. A connection structure comprising a first component according to claim 11 and a second component arranged at a distance to the first component as well as a fastening screw, wherein a. the first inner thread is provided directly in the first component and b. a second inner thread of a second thread direction opposite to the first thread direction is provided at the second component so that c. the fastening screw extends through the first component and the adjusting element arranged at least partly therein and is fastened in the second inner thread at the second component.

14. A connection structure comprising a first component according to claim 11 and a second component arranged at a distance to the first component as well as a fastening screw, wherein a. the first inner thread and a second inner thread is provided at the first component so that b. the fastening screw extends through the second component and the adjusting element abutting at the second component and is fastened in the second inner thread at the first component.

* * * * *